(12) United States Patent
Stockman et al.

(10) Patent No.: US 12,451,295 B2
(45) Date of Patent: Oct. 21, 2025

(54) HARD START KIT FOR MULTIPLE REPLACEMENT APPLICATIONS

(71) Applicant: AmRad Manufacturing, LLC, Universal City, TX (US)

(72) Inventors: Richard W. Stockman, Ormond Beach, FL (US); Robert M. Stockman, Palm Coast, FL (US)

(73) Assignee: AmRad Manufacturing, LLC, Universal City, TX (US)

( * ) Notice: Subject to any disclaimer, the term of this patent is extended or adjusted under 35 U.S.C. 154(b) by 0 days.

(21) Appl. No.: 17/891,788

(22) Filed: Aug. 19, 2022

(65) Prior Publication Data

US 2022/0392710 A1 Dec. 8, 2022

Related U.S. Application Data

(63) Continuation of application No. 16/219,646, filed on Dec. 13, 2018, now Pat. No. 11,424,077.
(Continued)

(51) Int. Cl.
*H01G 4/232* (2006.01)
*H01G 4/236* (2006.01)
(Continued)

(52) U.S. Cl.
CPC .............. *H01G 4/32* (2013.01); *H01G 4/232* (2013.01); *H01G 4/236* (2013.01); *H01G 4/38* (2013.01);
(Continued)

(58) Field of Classification Search
CPC ........ H01G 2/103; H01G 4/228; H01G 4/232; H01G 4/236; H01G 4/32; H01G 4/38;
(Continued)

(56) References Cited

U.S. PATENT DOCUMENTS 1,665,499 A   4/1928   Hoch
1,707,959 A   4/1929   Fried
(Continued)

FOREIGN PATENT DOCUMENTS

CA        2285721       4/2000
CA         188725      12/2021
(Continued)

OTHER PUBLICATIONS

US 10,504,654 B2, 12/2019, Stockman (withdrawn)
(Continued)

*Primary Examiner* — Timothy J Thompson
*Assistant Examiner* — Guillermo J Egoavil
(74) *Attorney, Agent, or Firm* — Fish & Richardson P.C.

(57) ABSTRACT

A hard start capacitor replacement unit has a plurality of capacitors in a container sized to fit in existing hard start capacitor space. The capacitors are 4 metallized film capacitors wound in a single cylindrical capacitive element. The container has a common terminal and capacitors value terminals for the plurality of capacitors, which may be connected singly or in combination to provide a selected capacitance. An electronic or other relay connects the selected capacitance in parallel with a motor run capacitor. The hard start capacitor replacement unit is thereby adapted to replace a wide variety of hard start capacitors.

19 Claims, 10 Drawing Sheets

Related U.S. Application Data

(60) Provisional application No. 62/598,111, filed on Dec. 13, 2017.

(51) Int. Cl.
  *H01G 4/32* (2006.01)
  *H01G 4/38* (2006.01)
  *H01G 5/38* (2006.01)
  *H02P 1/44* (2006.01)

(52) U.S. Cl.
  CPC .............. *H01G 5/38* (2013.01); *H02P 1/44* (2013.01); *H02P 1/445* (2013.01)

(58) Field of Classification Search
  CPC .... H01G 4/40; H01G 5/38; H02P 1/44; H02P 1/445
  USPC ................................ 361/301.5, 329
  See application file for complete search history.

(56) References Cited

U.S. PATENT DOCUMENTS

| | | |
|---|---|---|
| 1,789,949 A | 1/1931 | Georgiev |
| 1,943,714 A | 1/1934 | Bailey |
| 2,050,062 A | 8/1936 | Mershon |
| 2,202,166 A | 5/1940 | Peck |
| D122,825 S | 10/1940 | Peck |
| D124,726 S | 1/1941 | Shimer |
| D130,952 S | 12/1941 | Miller |
| 2,296,123 A | 9/1942 | Stimson |
| 2,569,925 A | 10/1951 | Deeley |
| 2,607,833 A | 8/1952 | Schomaker |
| 2,779,813 A | 1/1957 | Collins |
| 2,896,008 A | 7/1959 | Putz |
| 2,968,752 A | 1/1961 | Rubinstein |
| 2,974,234 A | 3/1961 | Rowe |
| 3,010,056 A | 11/1961 | Kurland |
| 3,015,687 A | 1/1962 | Ruscito |
| 3,041,477 A * | 6/1962 | Budts ............... H03K 19/09 327/221 |
| 3,210,457 A | 10/1965 | Hancock |
| 3,246,205 A | 4/1966 | Miller |
| 3,302,081 A | 1/1967 | Grahame |
| 3,304,473 A | 2/1967 | Netherwood et al. |
| D209,054 S | 10/1967 | Braiman et al. |
| D210,210 S | 2/1968 | Braiman et al. |
| 3,377,510 A | 4/1968 | Rayno |
| 3,454,858 A | 7/1969 | Robinson |
| 3,473,088 A | 10/1969 | Ernst |
| 3,524,614 A | 8/1970 | Sorth |
| 3,553,542 A | 1/1971 | Stonemetz |
| 3,555,370 A | 1/1971 | Bowling |
| 3,593,066 A | 7/1971 | Norman |
| 3,771,321 A | 11/1973 | Maksy |
| 3,803,457 A | 4/1974 | Yamamoto |
| 3,921,041 A | 11/1975 | Stockman |
| 3,955,170 A | 5/1976 | Geishecker |
| 3,988,650 A | 10/1976 | Fritze |
| 4,009,425 A | 2/1977 | Muranaka |
| 4,028,595 A | 6/1977 | Stockman |
| 4,095,902 A | 6/1978 | Florer et al. |
| 4,106,068 A | 8/1978 | Flanagan |
| 4,107,758 A | 8/1978 | Shirn et al. |
| 4,112,424 A | 9/1978 | Lapeyre |
| 4,112,474 A | 9/1978 | Wilson et al. |
| D253,887 S | 1/1980 | Truner et al. |
| 4,190,702 A | 2/1980 | Pun et al. |
| 4,209,815 A | 6/1980 | Rollins et al. |
| 4,240,126 A | 12/1980 | Sanvito |
| 4,263,638 A | 4/1981 | Stockman et al. |
| 4,312,027 A | 1/1982 | Stockman |
| 4,326,237 A | 4/1982 | Markarian et al. |
| 4,352,145 A | 9/1982 | Stockman |
| 4,360,848 A | 11/1982 | Noutko et al. |
| 4,363,078 A | 12/1982 | Dwyer |
| 4,388,669 A | 6/1983 | Cichanowski |
| 4,398,782 A | 8/1983 | Markarian |
| 4,408,818 A | 10/1983 | Markarian |
| 4,420,791 A | 12/1983 | Shedigian |
| 4,447,854 A | 5/1984 | Markarian |
| 4,459,637 A | 7/1984 | Shedigian |
| 4,486,809 A | 12/1984 | Deak et al. |
| 4,546,300 A | 10/1985 | Shaikh |
| 4,558,394 A | 12/1985 | Stockman |
| 4,586,107 A | 4/1986 | Price |
| 4,609,967 A | 9/1986 | Shedigian |
| 4,621,301 A | 11/1986 | Shedigian |
| 4,631,631 A | 12/1986 | Hodges et al. |
| 4,633,365 A | 12/1986 | Stockman |
| 4,633,367 A | 12/1986 | Strange et al. |
| 4,633,369 A | 12/1986 | Lapp et al. |
| 4,639,828 A | 1/1987 | Strange et al. |
| 4,642,731 A | 2/1987 | Shedigian |
| 4,698,725 A | 10/1987 | MacDougall et al. |
| 4,737,785 A | 4/1988 | Zottnik |
| 4,754,361 A | 6/1988 | Venturini |
| 4,757,414 A | 7/1988 | Barker et al. |
| 4,768,129 A | 8/1988 | Sasaki |
| 4,811,161 A | 3/1989 | Sasaki |
| 4,812,941 A | 3/1989 | Rice et al. |
| 4,813,116 A | 3/1989 | Thiel et al. |
| 4,897,760 A | 1/1990 | Bourbeau |
| D307,000 S | 4/1990 | Sasaki |
| 4,992,910 A | 2/1991 | Evans |
| 5,006,726 A | 4/1991 | Okumura |
| 5,019,934 A | 5/1991 | Bentley et al. |
| 5,032,948 A | 7/1991 | Sakai |
| 5,138,519 A | 8/1992 | Stockman |
| 5,148,347 A | 9/1992 | Cox et al. |
| 5,162,718 A | 11/1992 | Schroeder |
| 5,196,818 A * | 3/1993 | Anderson ................. A45F 5/00 224/183 |
| 5,247,236 A * | 9/1993 | Schroeder ............... H02P 1/445 318/785 |
| 5,280,219 A | 1/1994 | Ghanbari |
| 5,313,360 A | 5/1994 | Stockman |
| 5,381,301 A | 1/1995 | Hudis |
| 5,412,532 A | 5/1995 | Nishimori |
| 5,528,120 A | 6/1996 | Brodetsky |
| 5,561,357 A * | 10/1996 | Schroeder ................. H02P 1/44 318/785 |
| 5,673,168 A | 9/1997 | Efford et al. |
| 5,691,845 A * | 11/1997 | Iwatsuka ................. G02F 1/093 385/11 |
| 5,817,975 A | 10/1998 | Heilmann et al. |
| 5,847,919 A | 12/1998 | Shimizu et al. |
| 5,866,276 A | 2/1999 | Ogami et al. |
| D408,266 S | 4/1999 | Santiago |
| 5,921,820 A | 7/1999 | Dijkstra |
| 5,940,263 A | 8/1999 | Jakoubovitch |
| 6,009,348 A | 12/1999 | Rorvick et al. |
| 6,014,308 A | 1/2000 | Stockman |
| 6,031,713 A | 2/2000 | Takeisha et al. |
| 6,064,563 A | 5/2000 | Yamada et al. |
| 6,084,764 A | 7/2000 | Anderson |
| 6,141,205 A | 10/2000 | Nutzman |
| 6,147,856 A | 11/2000 | Karidis |
| 6,157,531 A | 12/2000 | Breyen et al. |
| 6,160,465 A * | 12/2000 | Yamaguchi ............. H01F 17/06 336/212 |
| 6,212,058 B1 | 4/2001 | Huber |
| 6,222,270 B1 | 4/2001 | Lee |
| 6,229,236 B1 | 5/2001 | Fisher |
| 6,233,133 B1 | 5/2001 | Weng |
| 6,282,078 B1 | 8/2001 | Tsai |
| 6,282,081 B1 | 8/2001 | Takabayashi et al. |
| 6,310,756 B1 | 10/2001 | Miura et al. |
| 6,313,978 B1 | 11/2001 | Stockman et al. |
| 6,320,348 B1 | 11/2001 | Kadah |
| 6,373,720 B1 | 4/2002 | Fechtig et al. |
| 6,385,490 B1 | 5/2002 | O'Phelan |
| 6,404,618 B1 | 6/2002 | Beard et al. |
| 6,410,184 B1 | 6/2002 | Horiuchi |

(56) References Cited

U.S. PATENT DOCUMENTS

| | | | |
|---|---|---|---|
| D464,028 S | 10/2002 | Clark | |
| 6,466,429 B1 | 10/2002 | Volfkovich et al. | |
| 6,490,158 B1 | 12/2002 | Ellyson et al. | |
| 6,538,544 B1 * | 3/2003 | Hardy | B66C 1/04 335/295 |
| 6,552,893 B2 | 4/2003 | Tanaka | |
| 6,697,249 B2 | 2/2004 | Maletin et al. | |
| 6,706,079 B1 | 3/2004 | Shmatko et al. | |
| 6,720,689 B2 | 4/2004 | Agnes et al. | |
| 6,798,677 B2 | 9/2004 | Jakob et al. | |
| 6,807,048 B1 | 10/2004 | Nielsen | |
| 6,816,541 B1 | 11/2004 | Hong | |
| 6,819,545 B1 | 11/2004 | Lobo et al. | |
| 6,842,328 B2 | 1/2005 | Schott | |
| 6,847,517 B2 | 1/2005 | Iwaida et al. | |
| D505,211 S | 5/2005 | Stanchfrield | |
| 6,888,266 B2 | 5/2005 | Burke et al. | |
| 6,922,330 B2 | 7/2005 | Nielson et al. | |
| 6,930,874 B2 | 8/2005 | Lobot et al. | |
| 6,982,539 B1 | 1/2006 | Ward | |
| 6,995,971 B2 | 2/2006 | Norton | |
| 7,031,139 B1 | 4/2006 | Fayram | |
| 7,046,498 B1 | 5/2006 | Huang | |
| D522,456 S | 6/2006 | Matsumoto | |
| D524,758 S | 7/2006 | Sweeney | |
| D525,209 S | 7/2006 | Sweeney | |
| D529,202 S | 9/2006 | Nagai et al. | |
| 7,110,240 B2 | 9/2006 | Breyen | |
| 7,184,256 B1 | 2/2007 | Sato | |
| D541,218 S | 4/2007 | Colopy | |
| 7,203,053 B2 | 4/2007 | Stockman | |
| 7,206,186 B1 | 4/2007 | Knight | |
| D541,746 S | 5/2007 | Colopy | |
| 7,251,123 B2 | 7/2007 | O'Phelan | |
| D551,943 S | 10/2007 | Hodjat | |
| D562,237 S | 2/2008 | Tu | |
| 7,337,945 B1 * | 3/2008 | Riggs | A47G 29/121 232/35 |
| 7,365,959 B1 | 4/2008 | Ward | |
| D573,008 S | 7/2008 | Sipe | |
| 7,423,861 B2 | 9/2008 | Stockman | |
| 7,474,519 B2 | 1/2009 | Stockman | |
| 7,474,520 B2 | 1/2009 | Kashihara | |
| 7,492,574 B2 | 2/2009 | Fresard et al. | |
| 7,511,941 B1 | 3/2009 | Gallay | |
| 7,521,148 B2 | 4/2009 | Kim | |
| 7,547,233 B2 | 6/2009 | Inoue et al. | |
| 7,619,420 B2 | 11/2009 | Stockman | |
| 7,667,954 B2 | 2/2010 | Lessner | |
| 7,710,713 B2 | 5/2010 | Restorff | |
| D621,789 S | 8/2010 | Wang et al. | |
| D623,500 S | 9/2010 | Langner | |
| 7,835,133 B2 | 11/2010 | Stockman | |
| 7,848,079 B1 | 12/2010 | Gordin et al. | |
| 7,867,290 B2 | 1/2011 | Nielsen | |
| 7,881,043 B2 | 2/2011 | Hirose et al. | |
| 7,911,762 B2 | 3/2011 | Stockman | |
| 7,911,766 B2 | 3/2011 | Caumont et al. | |
| 7,952,854 B2 | 5/2011 | Stockman | |
| 7,987,593 B1 | 8/2011 | Gorst | |
| 8,029,290 B2 | 10/2011 | Johnson | |
| 8,159,810 B1 | 4/2012 | Gorst et al. | |
| 8,170,662 B2 | 5/2012 | Bocek | |
| 8,174,817 B2 | 5/2012 | Georgopoulos et al. | |
| 8,270,143 B2 | 9/2012 | Stockman | |
| 8,274,778 B2 | 9/2012 | Yoshinaga et al. | |
| 8,310,802 B2 | 11/2012 | Fujii et al. | |
| 8,331,076 B2 | 12/2012 | Tuncer | |
| D681,438 S | 5/2013 | Chen | |
| 8,456,795 B2 * | 6/2013 | Stockman | H02P 1/44 361/301.3 |
| 8,465,555 B2 | 6/2013 | Sherwood | |
| 8,472,164 B2 | 6/2013 | Kim | |
| 8,514,547 B2 | 8/2013 | Galvagni | |
| 8,514,548 B2 | 8/2013 | Miller et al. | |
| 8,531,815 B2 | 9/2013 | Stockman | |
| 8,537,522 B2 | 9/2013 | Stockman | |
| 8,559,161 B2 | 10/2013 | Takeoka et al. | |
| 8,619,409 B2 | 12/2013 | Yawata et al. | |
| D707,639 S | 6/2014 | Rego | |
| 8,761,875 B2 | 6/2014 | Sherwood | |
| 8,842,411 B2 | 9/2014 | Zhang | |
| 8,853,318 B2 | 10/2014 | Tielemans | |
| 8,861,178 B2 | 10/2014 | Terashima et al. | |
| 8,861,184 B2 | 10/2014 | Schmidt | |
| 8,871,850 B2 | 10/2014 | Koh et al. | |
| 8,885,318 B2 | 11/2014 | Stockman | |
| 8,891,224 B2 | 11/2014 | Stockman | |
| D728,480 S | 5/2015 | Chang | |
| D729,164 S | 5/2015 | Chen | |
| 9,105,401 B2 | 8/2015 | Dreissig | |
| D747,225 S | 1/2016 | Decook | |
| 9,318,261 B2 | 4/2016 | Stockman | |
| 9,324,501 B2 | 4/2016 | Stockman | |
| 9,343,238 B2 | 5/2016 | Stockman | |
| 9,378,893 B2 | 6/2016 | Stockman | |
| 9,412,521 B2 | 8/2016 | Stockman | |
| 9,424,995 B2 | 8/2016 | Stockman | |
| 9,466,429 B1 | 10/2016 | Casanova | |
| D771,567 S | 11/2016 | Flohe et al. | |
| 9,496,086 B2 | 11/2016 | Stockman | |
| 9,536,670 B2 | 1/2017 | Stockman | |
| D795,819 S | 8/2017 | Okamoto et al. | |
| 9,859,060 B1 | 1/2018 | Stockman et al. | |
| 9,916,934 B1 | 3/2018 | Casanova et al. | |
| 9,947,467 B2 | 4/2018 | Goodson et al. | |
| D816,470 S | 5/2018 | Green | |
| D818,437 S | 5/2018 | Stockman | |
| D818,959 S | 5/2018 | Stockman | |
| 10,056,194 B2 | 8/2018 | Stockman | |
| 10,056,195 B2 | 8/2018 | Stockman | |
| D829,173 S | 9/2018 | Stockman | |
| 10,134,528 B2 | 11/2018 | Stockman | |
| 10,147,549 B2 | 12/2018 | Stockman | |
| 10,147,550 B1 | 12/2018 | Stockman | |
| 10,163,571 B2 | 12/2018 | Stockman | |
| 10,209,751 B2 | 2/2019 | Zikes | |
| 10,249,439 B2 | 4/2019 | Stockman | |
| 10,256,195 B2 | 4/2019 | Yamamoto | |
| 10,366,840 B1 | 7/2019 | Stockman | |
| 10,475,588 B2 | 11/2019 | Stockman | |
| 10,497,518 B1 | 12/2019 | Stockman | |
| 10,497,520 B1 | 12/2019 | Stockman | |
| 10,586,655 B1 | 3/2020 | Stockman | |
| D886,741 S | 6/2020 | Okajima et al. | |
| D892,741 S | 8/2020 | Biere | |
| D893,441 S | 8/2020 | Rao | |
| D906,247 S | 12/2020 | Stockman | |
| D906,969 S | 1/2021 | Stockman | |
| D914,605 S | 3/2021 | Xin | |
| 11,177,074 B1 | 11/2021 | Stockman | |
| 11,183,330 B2 | 11/2021 | Stockman | |
| 11,183,335 B2 | 11/2021 | Stockman et al. | |
| 11,183,336 B2 | 11/2021 | Stockman et al. | |
| 11,183,337 B1 | 11/2021 | Stockman et al. | |
| 11,183,338 B2 | 11/2021 | Stockman | |
| 11,183,341 B1 | 11/2021 | Stockman | |
| 11,189,425 B1 | 11/2021 | Stockman et al. | |
| 11,189,426 B1 | 11/2021 | Stockman | |
| D937,785 S | 12/2021 | Hess | |
| D938,912 S | 12/2021 | Stockman | |
| 11,195,663 B2 | 12/2021 | Stockman | |
| 11,424,077 B1 | 8/2022 | Stockman et al. | |
| 11,575,298 B2 | 2/2023 | Waldrop et al. | |
| D1,045,798 S | 10/2024 | Stockman | |
| 12,125,645 B1 | 10/2024 | Stockman | |
| D1,052,528 S | 11/2024 | Stockman | |
| D1,054,379 S | 12/2024 | Stockman | |
| D1,054,986 S | 12/2024 | Stockman | |
| 2001/0025618 A1 | 10/2001 | Kelling | |
| 2002/0030548 A1 | 3/2002 | Dejima | |
| 2005/0272012 A1 | 12/2005 | Logan et al. | |
| 2006/0007387 A1 | 1/2006 | Xiao | |
| 2006/0050468 A1 | 3/2006 | Inoue et al. | |

(56) References Cited

U.S. PATENT DOCUMENTS

| | | |
|---|---|---|
| 2006/0067031 A1 | 3/2006 | Crane |
| 2006/0201971 A1 | 9/2006 | Wegman |
| 2006/0227495 A1 | 10/2006 | Stockman |
| 2007/0025051 A1* | 2/2007 | Stockman ............... H01G 5/38 361/301.5 |
| 2007/0221278 A1 | 9/2007 | Sartorius |
| 2007/0236860 A1 | 10/2007 | Stockman |
| 2007/0279015 A1 | 12/2007 | Livingston et al. |
| 2007/0283707 A1 | 12/2007 | Hatano |
| 2007/0295877 A1 | 12/2007 | Gaydos |
| 2008/0025549 A1* | 1/2008 | Avera .................... H04R 9/022 381/397 |
| 2008/0158780 A1 | 7/2008 | Stockman |
| 2008/0217053 A1 | 9/2008 | Vojtila et al. |
| 2009/0001921 A1 | 1/2009 | Mills |
| 2009/0052109 A1 | 2/2009 | Stockman et al. |
| 2009/0059463 A1 | 3/2009 | Ward |
| 2009/0115557 A1 | 5/2009 | Minowa |
| 2009/0219665 A1 | 9/2009 | Stockman |
| 2009/0261762 A1 | 10/2009 | Tsuchiya |
| 2011/0063775 A1 | 3/2011 | Stockman |
| 2011/0075342 A1 | 3/2011 | Gotham et al. |
| 2011/0134584 A1* | 6/2011 | Stockman ............... H01G 5/38 361/328 |
| 2011/0157764 A1 | 6/2011 | Stockman |
| 2011/0228444 A1 | 9/2011 | Lai et al. |
| 2011/0228446 A1 | 9/2011 | Stockman |
| 2011/0317333 A1 | 12/2011 | Chun |
| 2012/0026046 A1 | 2/2012 | Bit-Babik |
| 2013/0003252 A1 | 1/2013 | Stockman |
| 2013/0214720 A1 | 8/2013 | Stockman |
| 2013/0329342 A1 | 12/2013 | Stockman |
| 2013/0343029 A1 | 12/2013 | Stockman |
| 2014/0049205 A1 | 2/2014 | Curiel |
| 2014/0126107 A1 | 5/2014 | Yoda et al. |
| 2014/0138009 A1 | 5/2014 | Lim |
| 2014/0201018 A1 | 7/2014 | Chassin |
| 2014/0232485 A1 | 8/2014 | Bultitude |
| 2014/0285949 A1 | 9/2014 | Stockman |
| 2014/0347784 A1 | 11/2014 | Stockman et al. |
| 2015/0016012 A1 | 1/2015 | Stockman |
| 2015/0022991 A1 | 1/2015 | Stockman et al. |
| 2015/0138690 A1 | 5/2015 | Stockman |
| 2015/0255218 A1 | 9/2015 | Stockman et al. |
| 2015/0287308 A1 | 10/2015 | Shuttleworth |
| 2016/0028230 A1 | 1/2016 | Elfman |
| 2016/0203916 A1* | 7/2016 | Stockman ............... H02P 1/44 361/329 |
| 2016/0233030 A1 | 8/2016 | Stockman |
| 2017/0011855 A1 | 1/2017 | Stockman et al. |
| 2017/0032898 A1 | 2/2017 | Stockman |
| 2017/0110252 A1 | 4/2017 | Stockman |
| 2017/0186554 A1 | 6/2017 | Stockman |
| 2017/0229242 A1 | 8/2017 | Goodson et al. |
| 2017/0236646 A1 | 8/2017 | Stockman |
| 2017/0372838 A1 | 12/2017 | Casanova et al. |
| 2018/0061600 A1 | 3/2018 | Ito |
| 2018/0090278 A1 | 3/2018 | Stockman et al. |
| 2018/0254150 A1 | 9/2018 | Stockman et al. |
| 2018/0261391 A1 | 9/2018 | Stockman |
| 2019/0057815 A1 | 2/2019 | Stockman |
| 2019/0057817 A1 | 2/2019 | Stockman |
| 2020/0066470 A1 | 2/2020 | Mitchell |
| 2020/0143994 A1 | 5/2020 | Stockman |
| 2020/0155983 A1 | 5/2020 | Maeda |
| 2020/0161057 A1 | 5/2020 | Stockman et al. |
| 2020/0211780 A1 | 7/2020 | Stockman |
| 2020/0251285 A1 | 8/2020 | Stockman |
| 2022/0328247 A1 | 10/2022 | Stockman |
| 2022/0328254 A1 | 10/2022 | Stockman |
| 2022/0336156 A1 | 10/2022 | Stockman |
| 2022/0336157 A1 | 10/2022 | Stockman |
| 2022/0336161 A1 | 10/2022 | Stockman |
| 2022/0344101 A1 | 10/2022 | Stockman |
| 2022/0352789 A1 | 11/2022 | Waldrop et al. |
| 2023/0261549 A1 | 8/2023 | Waldrop et al. |
| 2023/0307188 A9 | 9/2023 | Stockman |
| 2023/0307189 A1 | 9/2023 | Stockman |
| 2023/0411082 A1 | 12/2023 | Stockman |
| 2024/0006126 A1 | 1/2024 | Stockman |
| 2024/0029961 A1 | 1/2024 | Stockman |
| 2024/0395468 A1 | 11/2024 | Stockman |

FOREIGN PATENT DOCUMENTS

| | | | |
|---|---|---|---|
| CA | 204951 | 12/2021 | |
| CA | 204952 | 1/2022 | |
| CN | 2033169 | 2/1989 | |
| CN | 2709602 Y | * 7/2005 | ............ E05C 17/46 |
| CN | 3607691 | 2/2007 | |
| CN | 101991323 | 3/2011 | |
| CN | 301914077 | 5/2012 | |
| CN | 103490222 B | * 1/2014 | ............ H01R 13/62 |
| CN | 104201077 | 12/2014 | |
| CN | 204351550 | 5/2015 | |
| CN | 204351550 U | * 5/2015 | ........... A47G 29/087 |
| CN | 204539389 U | * 8/2015 | |
| CN | 304472828 | 1/2018 | |
| CN | 304806073 | 9/2018 | |
| CN | 305610350 | 2/2020 | |
| CN | 305625370 | 2/2020 | |
| CN | 305780976 | 5/2020 | |
| CN | 308082810 | 6/2023 | |
| EP | 129714 | 1/1985 | |
| EP | 1115128 | 7/2001 | |
| EP | 2587503 | 3/2014 | |
| FR | 2343221 | 9/1977 | |
| FR | 2802708 | 6/2001 | |
| GB | 517718 | 2/1940 | |
| GB | 2169747 | 7/1986 | |
| GB | 2070861 | 12/1997 | |
| JP | S498747 A | 1/1974 | |
| JP | S498748 | 2/1974 | |
| JP | H04139807 | 5/1992 | |
| JP | 07211596 A | 8/1995 | |
| JP | D1273871 | 6/2006 | |
| JP | D1288240 | 12/2006 | |
| JP | 2007059477 A | 3/2007 | |
| JP | D1456333 | 11/2012 | |
| JP | 2015130259 | 7/2015 | |
| KR | 20160061825 | 6/2016 | |
| MX | 62279 | 8/2021 | |
| MX | 65643 | 12/2022 | |
| WO | WO 2010031594 | 3/2010 | |
| WO | WO 2010037186 | 4/2010 | |
| WO | WO 2014190072 | 11/2014 | |
| WO | WO 2020123834 | 6/2020 | |

OTHER PUBLICATIONS

[No Author Listed], "AC Capacitors," brochure by AmRad Engineering, Inc., May 19, 2014, 4 pages.

[No Authorlisted] "Industrial Power Factor Correction Capacitors," Cornell Dubilier, Undated (1 page).

[No Authorlisted] "The Patented Ultramet™ Capacitor," poster by American Radionic Co., Inc., (undated) (three pages).

[No Authorlisted] "The Patented Ultramet™ Capacitor. A product of years of American Radionic research & development," poster by American Radionic Co., Inc. (undated) (one page).

"American Radionic Co., Inc. Introduces A New Circuit Component The Patented Ultramet™ Capacitor," poster by American Radionic Co., Inc., (poster undated, 1980 year date appears below one image), (one page).

"American Radionic Co., Inc. Introduces A New Circuit Component, The Patented Ultramet™ Capacitor," poster by American Radionic Co., Inc., which is reprint from Electronic News dated Feb. 11, 1980, (one page).

"American Radionic Co., Inc. Introduces . . . The World's First Multiple Metallized Film Dielectric Capacitor Produced from a Single Winding! The Patented Ultramet™ Capacitor," poster by American Radionic Co., Inc. (undated) (one page).

(56) References Cited

OTHER PUBLICATIONS

"American Radionic Introduces Capacitors Without Compromise", color brochure, 1989, (1 page).
"Product of the Year Awards," Electronic Products Magazine, Jan. 1981, pp. 39-45.
"Super-Sized Show," ASHRae Journal Show Daily, 2005 International Air-Conditioning, Heating, Refrigerating Exposition, Tuesday, Feb. 8, 2005 (24 pages).
Amazon.com [online] "TEMCo Dual Run Capacitor RC0120-50/5 nnfd 370 V 440 V Vac volt 50+5 uf AC Electric Motor HVAC," Aug. 29, 2014, retrieved on Oct. 22, 2018, retrieved from UR:<<https://www.amazon.com/TEMCo-Capacitor-RC0120-50-ElectricMotor/dp/B01H0S87X6/ref=pd_sim_328_5>, 6 pages.
Amazon.com [online], "2"x3" Dry Erase Labels w/ clear Protective Flap, 50/Roll Backed w/ Clean-Remove Adhesive (Blue)," Apr. 1, 2015, retrieved on Apr. 5, 2018, retrieved from <URL: https://www.amazon.com/Labels-Protective-Backed-Clean-Remove-Adhesive/dp/B00VIDW1C1/ref=sr_1_18?ie=UTF8&clid=1522957818&sr=8-18&keycY0E2')/080')/0A6.>, 7 pages.
Amazon.com [online], "40+5 uf/ Mfd round Dual Universal Capacitor Trane Replacement USA2235-used for 370 or 440 VAC," Jun. 20, 2014, retrieved on Dec. 10, 2018, retrieved from URCL<: https://www.amazon.com/Round-Universal-Capacitor-Replacement-USA2235/dpBOOGSU4401/ref=cnn_cr_arp_d_product_top?ie=UTF8, 6 pages.
Amazon.com [online], "7.5 uf/Mfd Oval Universal Capacitor Trane Replacement USA 2031-used for 370 or 440 VAC," Nov. 26, 2014, retrieved on Apr. 11, 2018, retrieved from <URL: https://www.amazon.com/Universal-Capacitor-Trane-Replacement-USA2031/dp/BOOGSU4OKW/ref=pd_sim_328_3?_encoding=UTF8&pd_rd_i=BOOGSU4OKW&pd_rd_r=YX6P84XR7NY113X4DWJG&pd_rd_w=gejaD&pd_rd_wg=NLVIY&psc=1&refRID=YX6P84XR7NY113X4DWJG.> 6 pages.
Amazon.com [online], "Amrad Engineering USA2215 Round Motor Run Capacitor, 40 MFD, 370/440 VAC," Dec. 4, 2013, retrieved on Oct. 10, 2018, retrieved from <URL:https://www.amazon.com/dp/B00FL70C0U/ref=cm_sw_r_cp_ep_dp_qIIZBbFD278ZE>, 6 pages.
Amazon.com [online], "AmRad Turbo 200 Mini Oval Capacitor: with label and color trim," May 5, 2015, retrieved on Apr. 10, 2018, retrieved from <URL: https://www.amazon.com/AmRad-Turbo-200-Mini-Oval/dp/BOOKQSKDOY/ref=pd_sbs_60_4?_encoding=UTF8&pd_rd_i=BOOKQSKDOY&pd_rd_r=A6')/0E2')/080')/0A6.>, 5 pages.
Amazon.com [online], "Amrad Turbo 200X Universal Motor Run Capacitor," Jan. 27, 2013, retrieved on Apr. 10, 2018, retrieved from <URL: https://www.amazon.com/Amrad-Turbo-Universal-Motor-Capacitor/dp/B00B610TOM/ref=pd_rhf_dp_s_cp_0_7?_encoding=UTF8&pd_rd_i=BOOB610TOM&pd_rd_r=N5WYCAD5Y36C86DFWDEG&pd_rd_w=6tW71&pd_rd_wg=DWEJcApsc=1&refRID=N5WYCAD5Y36C86DFWDEG.>, 6 pages.
Amazon.com [online], "AmRad USA2227 35+5 uf MFB 370 Volt VAC-Amrad Round Dual Run Capacitor Upgrade," Jun. 29, 2014, retrieved on Apr. 11, 2018, retrieved from <URL: https://www.amazon.com/AmRad-USA2227-MFD-370-Volt/dp/BOOGSU3YV8/ref=pd_day0_328_6?_encoding=UTF8&pd_rd_i=BOOGSU3YV8&pd_rd_r%E2')/080')/0A6.>, 6 pages.
Amazon.com [online], "MARS-Motors & Armatures 12788 45/5 MFD 440V Round Motor Dual Run Capacitor," Jan. 25, 2012, retrieved on Apr. 11, 2018, retrieved from <URL: https://www.amazon.com/MARS-Motors-Armatures-12788-Capacitor/dp/BOOCOYS2CM/ref=pd_sim_328_6?_encoding=UTF8&pd_rd_i=BOOCOYS2CM&pd_rd_r=KEFT1DXGOAWQ1KCZDJFJ&pd_rd_w=LNF6S&pd_rd_wg=5eFTh&psc=1&refRID=KEFT1DXGOAWQ1KCZDJFJ.>, 7 pages.
Amazon.com [online], "Packard TRCFB405 40+5MFD/440/370VAC/ RND Capacitor," May 1, 2015, retrieved on Apr. 26, 2018, retrieved from<URL: https://www.amazon.com/Packard-TRCFD405-5MFD-370VACCapacitor/dp/B009558E9U/ref=pd_sim_328_4?_encoding=UTF8&pd_rd_i=B009558E9U&pd_rd_r=SX1DRWZQZ8SH12JWHYH2&pd_rd_w=yljQe&pd_rd_wg=mH0n1&psc=1&refRID=SX1DRWZQZ8SH12JWHYH2&dp1D=31IxzeyCr/0252B7L&preST=_QL70_&dpSrc=detail.>, 5 pages.
Amazon.com [online], "PowerWell 35+5 uf MFD 370 or 440 Volt Dual Rub Round Capacitor Kit TP-CAP-35/5/440R Condenser Straight Cool/Heat Pump Air Conditioner and Zip Tie," Aug. 1, 2016, retired on Apr. 6, 2018, retrieved from <URL:https://www.amazon.com/dp/B01F7P8GJO/ref=sspa_dk_detail_4?psc=1.>, 6 pages.
Amazon.com [online], "Titan TRCFD405 Dual Rated Motor Run Capacitor Round MFD 40/5 volts 440/370," Aug. 21, 2016, retrieved on Apr. 11, 2016, retrieved from <URL: https://www.amazon.com/gp/product/B01HPK5ANO/ref=s9_dcacsd_dcoop_bw_c_x_6_w.>, 6 pages.
Amazon.com [online]. "CPT00656—45+5uf MFD 440 Volt VAC-Trane Round Dual Run Capacitor Upgrade," May 11, 2016, retrieved on Apr. 11, 2018, retrieved from <URL: https://www.amazon.com/CPT00656-Trane-Round-Capacitor-Upgrade/dp/BOOEVTIOMC/ref=cm_cr_arp_d_product_top?ie=UTF8.>, 6 pages.
Americanradionic.com, [online] "American Radionic Company's Chronology of Patents, New Products and Technology Transfer Programs—From the Present, to the Past, a Thirty-Five Year Review," online website having URL: http:/www.americanradionic.com/content/blogcategory/13/29/8/16 , accessed May 19, 2014 (undated) (3 pages).
Americanradionics.com, [online] "Home of the Turbo200 MultiUse Capacitor," online archive of website captured at http://web.archive.org/web/20050309191805fw_/http://www.americanradionic.com/home, Mar. 9, 2005, (16 pages), (accessed May 29, 2014).
Amradcapacitors.com [online], "Capacitors—Motor Run, Oil Filled Capacitors, AC Rated. AmRad." Printout of website having URL: http://amradcapacitors.com/index.htm, Jan. 3, 2003 (20 pages).
Answer and affirmative defenses to Complaint by Cornell-Dubliner Electronics, Inc. (Allaman, Melissa) (Entered: Jan. 9, 2015), 10 pages.
Answer and affirmative defenses to Complaint by Packard Inc. (Allaman, Melissa) (Entered: Jan. 9, 2015), 10 pages.
Archrnews.com, [online] "AmRad Engineering: Universal Capacitor," The Air Conditioning|Heating|Refrigeration News, Jan. 29, 2005, Printout of website having URL: "http://www.archrnews.com/articles/print/amrad-engineering-universal-capacitor" (accessed Jun. 2, 2014) (1 page).
Case Management and Scheduling Order: Amended Pleadings and Joinder of Parties due by Apr. 9, 2015. Discovery due by Feb. 16, 2016. Dispositive motions due by Apr. 7, 2016. Pretrial statement due by Aug. 11, 2016. All other motions due by Jul. 28, 2016. Plaintiff disclosure of expert report due by Dec. 10, 2015. Defendant disclosure of expert report due by Jan. 14, 2016. Final Pretrial Conference set for Aug. 18, 2016 at 01:15 PM in Orlando Courtroom 4 A before Judge Roy B. Dalton, Jr., Jury Trial Set for the trial team commencing Sep. 6, 2016 at 09:00 AM in Orlando Courtroom 4 A before Judge Roy B. Dalton Jr., Conduct mediation hearing by Mar. 29, 2016. Lead counsel to coordinate dates. Signed by Judge Roy B. Dalton, Jr. on Feb. 10, 2015. (VMF). (Entered: Feb. 10, 2015), 23 pages.
Complaint for Patent Infringement against Cornell-Dubliner Electronics, Inc., Packard Inc. with Jury Demand (Filing fee $400 receipt No. ORL-38930) filed by American Radionic Company, Inc. (Attachments: #1 Civil Cover sheet, #2 Exhibit A)(LMM) Modified on Nov. 19, 2014 (LMM). (Entered: Nov. 19, 2014), 47 pages.
Declaration of Noah C. Graubart in Support of Plaintiff's Claim Construction Brief by American Radionic Company, Inc. (Attachments: #1 Exhibit 1, #2 Exhibit 2, #3 Exhibit 3, #4 Exhibit 4, #5 Exhibit 5, #6 Exhibit 6) (Graubart, Noah) (Entered: Jun. 18, 2015), 250 pages.
Defendants' First Supplemental Disclosure of Non-Infringement and Invalidity Contentions *American Radionic, Inc.*, v. *Packard, Inc., and Cornell-Dubilier Electronics, Inc.*, No. 6:14-cv-01881-RBD-KRS, 26 pages.
Document from Defendants' First Supplemental Disclosure of Non-Infringement and Invalidity Contentions that purported to be Standard for Safety UL 810 Capacitors, Underwriters Laboratories Inc. having multiple dates ranging from 1976 to 1988 (22 pages).
Ebay.com [online], "25+3 uF MFDx370 / 440 VAC Motor Run Capacitator AmRad USA2224BA—Made in USA," ebay.com, 2020

(56) References Cited

OTHER PUBLICATIONS retrieved from URL: https://www.ebay.com/itm/25-3-uF-MFD-x-370-440-VAC-Motor-Run-Capacitor-AmRad-USA2224BA-Made-in-USA-/164162793031; retrieved on Oct. 28, 2020, 15 pages.
Edisontechcenter.org [online], "Batteries:types and History: Bright Star 1.5 V Columbia dry cell," 2014, retrieved on Jan. 4, 2019, retrieved from <http://edisontechcenter.org/batteries.html#drycell.>, 10 pages.
Eveready.com [online], "1950s Eveready Battery," 2018, retrieved on Nov. 30, 2018, retrieved from URL<http://www.eveready.com/about-us/battery-history>, 2 pages.
First Amended Answer and affirmative defenses to 1 Complaint by Cornell-Dubliner Electronics, Inc. (Allaman, Melissa) (Entered: Feb. 4, 2015), 17 pages.
First Amended Answer and affirmative defenses to 1 Complaint by Packard Inc. (Allaman, Melissa) (Entered: Jan. 9, 2015), 17 pages.
Grainger, "Round Motor Dual Run Capacitor, 40/5 Microfarad Rating, 370VAC Voltage," 2017, retrieved on Aug. 24, 2017, Retrieved from the Internet: URL<https://www.grainger.com/product/5CMW3&AL!2966!3!166587674359!!!g!82128730437!?cm_mmc=PPC:+Google+PLA?campaignid=719691765&s_kwcid=AL!2966!3!166587674359!!!!82128730437!&ef_id=WRSnxQAAAILWhRlb:20170824174108:s>, 5 pages.
Hudis, Martin et al., "Motor-Run Capacitors," Motors & Motor Control, undated (reprinted from Appliance Manufacturer, Oct. 1994) (3 pages).
Hudis, Martin, "Plastic Case Self-Protected Liquid Filled AC Capacitors for 70° Applications," Presented at CAPTECH '97, Mar. 1997, 7 pages.
Hudis, Martin, "Technology Evolution in Metallized Polymeric Film Capacitors over the Past 10 Years," Presented at CARTS Symposium in Nice, France, Oct. 1996, 9 pages.
International Search Report and Written Opinion, PCT/US2014/39003, Oct. 2, 2014, 12 pages.
Joint Pre-Hearing Statement re: Claim Construction by American Radionic Company, Inc., Packard Inc., Cornell-Dubliner Electronics, Inc. (Attachments: #1 Exhibit 1, #2 Exhibit 2) (Graubart, Noah) Modified on Jul. 24, 2015, 6 pages.
Macomber, Laird L., et al., "New Solid Polymer Aluminum Capacitors Improve Reliability," Electro Power Electronics, Oct. 1, 2001, 5 pages.
Macomber, Laird L., et al., "Solid Polymer Aluminum Capacitor Chips in DC-DC Converter Modules Reduce Cost and Size and Improve High-Frequency Performance," PCIM Power Electronics 2001 Proceeding for the PowerSystems World Conference, Sep. 2001, 8 pages.
Mallory Distributor Products Co., 1967 Precision Electronic Components Catalog, 52 pages.
Minute Entry, Proceedings of Claim Construction Hearing held before Judge Roy B. Dalton, Jr. on Aug. 24, 2015. Court Report: Arnie First (VMF) (FMV). (Entered: Aug. 24, 2015), 1 page.
NMR.mgh.harvard.edu [online], "Strategies to Repair or Replace Old Electrolytic Capacitors," available on or before Nov. 30, 2001, via Internet Archive: Wayback Machine URL <https://web.archive.org/web/20011130084328/https://www.nmr.mgh.harvard.edu/~reese/electrolytics/> retrieved on Apr. 22, 2021, URL <https://www.nmr.mgh.harvard.edu/-reese/electrolytics/, >, 6 pages.
Notice of Filing of Claim Construction Evidence by American Radionic Company, Inc. (Attachments: #1 Exhibit 1, #2 Exhibit 2, #3 Exhibit 3) (Graubart, Noah) Modified on Aug. 25, 2015 (EJS). (Entered: Aug. 25, 2015).
Order granting 69 Motion for Consent Judgment and Injunction, Signed by Judge Roy B. Dalton, Jr. on Nov. 5, 2015. (CAC) (Entered Nov. 5, 2015).
Parente, Audrey, "Can-sized device the right fit," The Daytona Beach News-Journal, Jan. 3, 2005 (2 pages).
PCT International Preliminary Report on Patentability in International Appln. No. PCT/US2007/89034, dated Jul. 9, 2009, 6 pages.
PCT International Preliminary Report on Patentability in International Appln. No. PCT/US2014/039003, dated Dec. 3, 2015, 7 pages.
PCT International Preliminary Report on Patentability in International Appln. No. PCT/US2019/068738, dated Jul. 8, 2021, 11 pages.
PCT International Search Report and Written Opinion in International Appln. No. PCT/US2007/89034, dated Apr. 18, 2008, 9 pages.
PCT International Search Report and Written Opinion in International Appln. No. PCT/US2019/068738, dated Mar. 10, 2020 13 pages.
Photograph 1 from Defendants' First Supplemental Disclosure of Non-Infringement and Invalidity Contentions, undated (1 page).
Photograph 10, from Defendants' First Supplemental Disclosure of Non-Infringement and Invalidity Contentions, undated (1 page).
Photograph 11, from Defendants' First Supplemental Disclosure of Non-Infringement and Invalidity Contentions, undated (1 page).
Photograph 12, from Defendants' First Supplemental Disclosure of Non-Infringement and Invalidity Contentions, undated (1 page).
Photograph 13, from Defendants' First Supplemental Disclosure of Non-Infringement and Invalidity Contentions, undated (1 page).
Photograph 14, from Defendants' First Supplemental Disclosure of Non-Infringement and Invalidity Contentions, undated (1 page).
Photograph 15, from Defendants' First Supplemental Disclosure of Non-Infringement and Invalidity Contentions, undated (1 page).
Photograph 16, from Defendants' First Supplemental Disclosure of Non-Infringement and Invalidity Contentions, undated (1 page).
Photograph 17, from Defendants' First Supplemental Disclosure of Non-Infringement and Invalidity Contentions, undated (1 page).
Photograph 18, from Defendants' First Supplemental Disclosure of Non-Infringement and Invalidity Contentions, undated (1 page).
Photograph 19, from Defendants' First Supplemental Disclosure of Non-Infringement and Invalidity Contentions, undated (1 page).
Photograph 2 from Defendants' First Supplemental Disclosure of Non-Infringement and Invalidity Contentions, undated (1 page).
Photograph 20, from Defendants' First Supplemental Disclosure of Non-Infringement and Invalidity Contentions, undated (1 page).
Photograph 3 from Defendants' First Supplemental Disclosure of Non-Infringement and Invalidity Contentions, undated (1 page).
Photograph 4 from Defendants' First Supplemental Disclosure of Non-Infringement and Invalidity Contentions, undated (1 page).
Photograph 5 from Defendants' First Supplemental Disclosure of Non-Infringement and Invalidity Contentions, undated (1 page).
Photograph 6 from Defendants' First Supplemental Disclosure of Non-Infringement and Invalidity Contentions, undated (1 page).
Photograph 7 from Defendants' First Supplemental Disclosure of Non-Infringement and Invalidity Contentions, undated (1 page).
Photograph 8, from Defendants' First Supplemental Disclosure of Non-Infringement and Invalidity Contentions, undated (1 page).
Photograph 9, from Defendants' First Supplemental Disclosure of Non-Infringement and Invalidity Contentions, undated (1 page).
Plaintiff's Brief re 59 Declaration Plaintiff's Claim Construction Brief filed by American Radionic Company, Inc. (Graubart, Noah) (Entered Jun. 18, 2015), 38 pages.
Response to Plaintiff's Claim Construction Brief re 60 Brief—Plaintiff filed by Cornell-Dubliner Electronics, Inc., Packard Inc. (Killen, Craig) Modified on Jul. 17, 2015 (EJS). (Entered Jul. 16, 2015), 29 pages.
Ruby Lane.com [online], "SuzansTreasures.shop, 1940s Mazon Cobalt Glass Jar Medicine Bottle," 2019, retrieved on Jul. 22, 2019, retrieved from URL<https://www.rubylane.com/item/34499-CCKx20-x20205/Mazon-Cobalt-Glass-Jar-Medicine-Bottle, 3 pages.
Status report Joint Claim Construction Statement by American Radionic Company, Inc., Packard Inc., and Cornell-Dubliner Electronics, Inc. (Attachments: #1 Exhibit 1, #2 Exhibit 2) (Graubart, Noah) Modified on May 29, 2015 (SWT). (Entered: May 28, 2015), 53 pages.
Transcript of Markman Hearing held on Aug. 24, 2015 before Judge Roy B. Dalton, Jr., Court Reporter Arnie R. First, DRD, CRR< ArnieFirst.CourtReporter@gmail.com. Transcript may be viewed at the court public terminal or purchased through the Court Reporter before the deadline for Release of Transcript Restriction. After that

(56) References Cited

OTHER PUBLICATIONS date it may be obtained through PACER or purchased through the court Reporter, Redaction Request due Oct. 22, 2015. Redacted Transcript Deadline set for Nov. 2, 2015. Release of Transcript Restriction set for Dec. 30, 2015. (ARF) (Entered: Oct. 1, 2015), 90 pages.
Webarchive.org [online] "Capacitors—Motor Run, Oil Filled Capacitors, AC Rated. AmRad." Online archive of website captured at http://webarchive.org/web/20041214091042/http://americanradionic.com, Dec. 14, 2004, (13 pages) (accessed May 29, 2014).
Webarchive.org [online], "Capacitors—Motor Run, Oil Filled Capacitors, AC Rated. AmRad." Online archive of website captured at http:/webarchive.org/web/20011126195819/http://www.americanradionic.com, Nov. 26, 2001, (13 pages) (accessed May 29, 2014).
Wikimedia.org [online], "Eveready PP4 battery," Oct. 22, 2016, retrieved on Nov. 30, 2018, retrieved from URL<https://connnnons.wikimedia.org/wiki/File:PP4-PP3-batteries.jpg>, 17 pages.
YouTube video [online] "AmRad's Turbo Installation" published on Apr. 22, 2012 by AmRad Engineering {link: https://www.youtube.com/watch?v=axo86NCbuNs&lc=UgguTwZgduBg5HgCoAEC}, 6 pages.
YouTube.com "HVAC Run capacitor Made in the USA," Sep. 4, 2011, retrieved on Apr. 6, 2018, retrieved from <URL: https://www.youtube.com/watch?v=Xiw_xHXJHUg.>, 4 pages.
YouTube.com [online], "AC Fan/Compressor Not Working—How to Test/Repair Broken HVAC Run Start Capacitor Air, GE Dual Run Capacitor," Oct. 1, 2015, retrieved on Apr. 11, 2018, retrieved from <URL: https://www.youtube.com/watch?v=19A9IvQ611A&t=3s.>, 5 pages.
YouTube.com [online], "How To Install The Turbo 200 Capacitor Pt. 2," Jul. 15, 2011, retrieved on Apr. 11, 2018, retrieved from <URL: https://www.youtube.com/watch?v=U7h7pg12t6M.>, 3 pages.
YouTube.com [online], "VAC Service : Install New Turbo 200 Capacitor," Jul. 29, 2011, retrieved on Apr. 11, 2018, retrieved from <URL: https://www.youtube.com/watch?v=R5B189BWrz0.>, 3 pages.
Amazon.com [online], "BlueStars—Hard Start Capacitor," Aug. 29, 2019, retrieved on May 17, 2023, retrieved from URL<https://www.amazon.co.uk/dp/B07X463KD1/>, 1 page.
Amazon.com [online], "BlueStars 35+3 MFD uf 370 or 440 Volt Dual Run Round Capacitor CBB65 Replacement Part," May 7, 2021, retrieved on Jul. 21, 2023, retrieved from URL<https://www.amazon.com/dp/B094C8P8NT/>, 9 pages.
Amradmanufacturing.com [online], "AmRad—Turbo Easy-Start 5," available on or before Sep. 22, 2020, retrieved on May 16, 2023, retrieved from URL<https://amradmanufacturing.com/products/turbo-easy-start-5/>, 14 pages.
Ktool.net [online], "Mars 12200 Turbo 200 2.5/5/5/10/20/25 MFD Universal Round Run Capacitor," available on or before Jul. 3, 2022, retrieved on Jul. 21, 2023, retrieved from URL<https://www.ktool.net/mars-12200-turbo-200-2-5-5-5-10-20-25-mfd-universal-round-run-capacitor/?gclid=EAlalQobChM187646ZyggAMVwX9MChOcfgwbEAQYBCABEglXV_D_BwE>, 5 pages.
Orbit.com [online], "Capacitor and relays. (Design-® Questel)," [Online PDF compilation of references selected by examiner], date ranges Dec. 1, 2004-Oct. 23, 2020, retrieved on May 24, 2023, retrieved from URL<https://www.orbit.com/export/UCZAH96B/pdf4/flfd9el a-5fbf46a1-a7a3-a0df0b968f4a-160819.pdf>, 18 pages.
Supplyhouse.com [online], "2.5-67.5 MFD, AmRad Turbo 200 Universal Capacitor (370/440V)," available on or before 2018, retrieved on Jul. 21, 2023, retrieved from URL<https://www.supplyhouse.com/MARS-12200-2-5-67-5-MFD-AmRad-Turbo-200-Universal-Capacitor-370-440V>, 4 pages.
Supplyhouse.com [online], "23-208 MFD Turbolytic JR Universal Replacement Capacitor (125-330V)," available on or before Apr. 5, 2016, retrieved on Jul. 27, 2023, retrieved from URL<https://www.supplyhouse.com/MARS-11100-23-208-MFD-Turbolytic-JR-Universal-Replacement-Capacitor-125-330V>, 4 pages.
Albmagnets.com [online], "25×10×1.5mm Block Magnets | F25×10×1.5mm-AD," available on or before 2023, retrieved on Jul. 24, 2023, retrieved from URL<https://www.albmagnets.com/block-magnets/2254-25-x-10-x-15mm-block-magnets-f401nasa.html>, 5 pages.
AnnexGlobal.com [online], "Full Line HVACR Product Catalog," 2018, retrieved on Sep. 4, 2020, retrieved from URL<https://www.annerexglobal.conn/innages/SUPCO.pdf.>, 188 pages.

* cited by examiner

HARD START KIT FOR MULTIPLE REPLACEMENT APPLICATIONS

CROSS-REFERENCE TO RELATED APPLICATIONS

This application is a continuation of and claims priority under 35 U.S.C. § 120 to U.S. application Ser. No. 16/219,646, filed on Dec. 13, 2018, which claims the benefit of priority under 35 U.S.C. § 119(e) to U.S. Provisional Application Ser. No. 62/598,111, filed on Dec. 13, 2017, the entire contents of which are hereby incorporated by reference.

TECHNICAL FIELD

The invention herein relates to a hard start capacitor replacement unit that is adaptable in the field for replacing any one of a plurality of multiple hard start modules.

BACKGROUND

Single phase induction motors of the type commonly used with air conditioner and cooling equipment compressors generally require some type of auxiliary start capacitor for starting the motor. If the motor is a permanent split capacitor motor, i.e. one that has a run capacitor permanently connected across the run and start windings the motor, the start capacitor is connected in parallel with the run capacitor. The start capacitor, also sometimes referred to as a "hard start capacitor," is connected for a short period of time to start the motor, and the start capacitor is disconnected from the motor near or at the time the motor achieves its run speed. This time is generally on the order of 50-100 milliseconds. Therefore, the start capacitor is wired in series with contacts for disconnecting it. The contacts can be a part of a potential or control relay, or an electronic relay.

If the start capacitor or the relay controlling it fails, the motor will not start. It is then necessary to replace the start capacitor and control relay, and this generally must be accomplished at the site of the motor. For air conditioners and other cooling equipment, this site could be a home, an office, a warehouse or factory, store, or any other building. This complicates the task of replacing the start capacitor and its connecting relay, in that a wide variety of brands and sizes of air conditioning and cooling units are in use, and these units use start capacitors having a variety of capacitances. Therefore, unless a repairman has a replacement hard start kit available with the correctly sized start capacitor, the repairman cannot complete repair without returning to a shop or parts distributor that has an inventory of hard start capacitor replacement parts.

Having to return to a shop or parts distributor in order to obtain the necessary materials to complete a repair is inefficient and time consuming and also delays the time that the customer's cooling system can be returned to operation.

Therefore, it would be advantageous if a repairman could carry one hard start replacement unit that is adaptable to many air conditioning units, cooling units, or other equipment utilizing single phase motors requiring a start capacitor, so that the repairman could adapt the hard start replacement unit to the requirements at hand and complete the repair in a timely manner.

SUMMARY

It is a principal object of the invention herein to provide a hard start capacitor replacement unit adaptable to more than one motor.

It is an additional object of the invention herein to provide a hard start capacitor replacement unit with selectable capacitance.

It is also an object of the invention to provide a hand start capacitor replacement unit with circuit interruption protection.

It is a further object of the invention herein to provide a hard start capacitor replacement unit that can be configured at a repair site to provide a desired selected capacitance.

It is also an object of the invention herein to provide a hard start capacitor replacement unit with at least four selectable capacitances.

It is another object of the invention herein to provide a hard start capacitor replacement unit with selectable capacitance that mounts in substantially the same space as an original start capacitor unit.

In carrying out the invention herein a hard start capacitor replacement unit is provided having a cylindrical container with a cover. A plurality of capacitors are provided within the container, each of said capacitors having a capacitance value. The cover mounts a common terminal electrically connected to common plates of each of said plurality of capacitors. The cover also mounts a plurality of capacitance value terminals spaced apart from the common terminal and from each other, with each capacitance value terminal respectively connected to a capacitor of a corresponding capacitance value. A relay has a contact and means for opening and closing said contact in response to voltage across start and run windings of a single phase electric motor. Wire means are provided for connecting one side of the contact of the relay to one of the start and run terminals of the electric motor. Wire means are also provided for connecting the other side of the contact of the relay to a cover terminal and for connecting another cover terminal to the other of the start and run terminals of the electric motor, at least one of the wire connections being to the common terminal on the cover and the other wire connection being to a capacitance value terminal, such that at least one capacitor is connected between the relay and the motor. The capacitance value terminal is selected to connect a capacitor of the desired capacitance value. Jumper wires are connected between capacitance value terminals on the cover to connect additional capacitors, in order to select a total desired capacitance value.

In other aspects of the invention, the capacitors are wound as individual sections of one cylindrical capacitive element. The capacitors may be metallized polymer capacitors. The film may be polypropylene with a zinc coating.

In another aspect of the invention, there are four capacitors within the cylindrical capacitor container. The values of the capacitors may be about 48 microfarads, about 48 microfarads, about 88 microfarads and about 112 microfarads, each having a corresponding capacitance value cover terminal.

In additional aspects of the invention herein, the cover has four capacitive value terminals and a common terminal. The common terminal is centered on the cover. The cover terminals are separated by insulating barriers. Jumper wires are provided to selectably connect capacitance value terminals.

In yet another aspect of the invention, the cover includes circuit interruption protection.

In a further aspect of the invention, the relay is an electronic relay. The relay may also be a control or potential relay. The relay is sized to be accommodated above the capacitor container within the projected cylindrical envelope thereof. A cylindrical cap is received on the capacitor container and extends therefrom to surround the relay and cover terminals. The cap is frictionally retained on the capacitor container and may be removed to make connections to selected capacitance value cover terminals.

The foregoing and other objects and features of the invention herein will, in part, appear in the following detailed description of the invention and claims, taken together with the drawings.

DESCRIPTION OF DRAWINGS

FIGS. 13A and 13B show the magnet of FIG. 13A in more detail.

The same reference numerals refer to the same elements throughout the various Figures.

DETAILED DESCRIPTION

Figure 1:
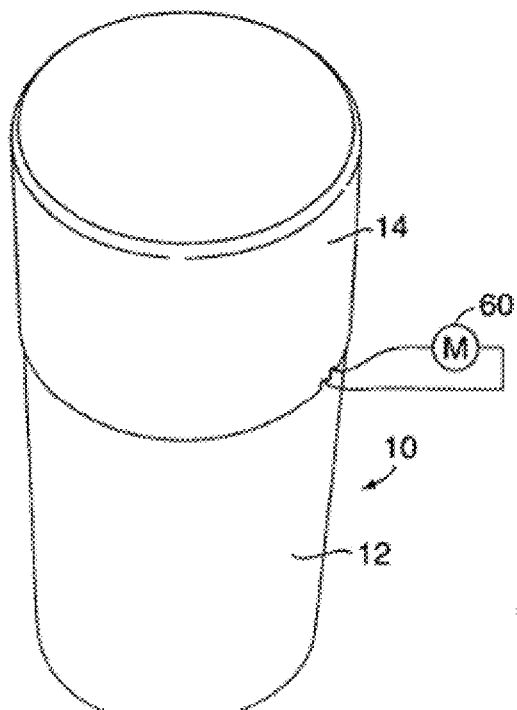
FIG. 1 is a perspective view of a hard start capacitor replacement unit according to the invention herein shown connected to a schematic motor.
Figure 2:
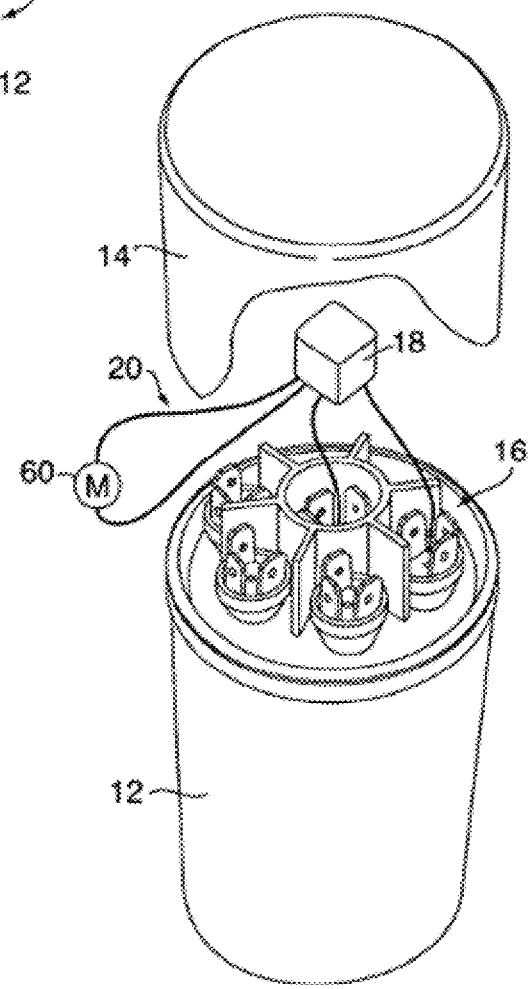
FIG. 2 is an exploded perspective view of the hard start capacitor replacement unit of FIG. 1.

With reference to FIG. 1, a hard start capacitor replacement unit 10 is shown, including a cylindrical capacitor container 12 and a cylindrical cap 14 fitted onto the container 12 and extending therefrom. With reference to FIG. 2, the cap 14 may be removed from the container 12, to expose the cover 16 of the container, an electronic relay 18, and wire means 20 providing desired electrical connections for the hard start capacitor replacement unit 10 to a motor 60.

The container 12 is preferably 2½ inches in diameter with a length of 5¾ inches and has a plurality of capacitors therein. In the embodiment shown and with reference to FIG. 3, four capacitors 22, 24, 26 and 28 are provided within the container 12. Also in the embodiment shown, the capacitors 22, 24, 26 and 28 are wound in a cylindrical capacitive element 30 having a common element terminal 32 at the bottom thereof and four capacitor terminals 23, 25, 27 and 29 at the top thereof.

The capacitors of capacitive element 30 are preferably metallized film capacitors concentrically wound together as the cylindrical capacitance element 30. The film is preferably polypropylene metallized with zinc and may be about 3.8 microns in thickness. This is an advantageous film for several reasons. First, start capacitors generally require a higher capacitance value than run capacitors, i.e., run capacitors generally have typical capacitance values in the range of about 15 to about 65 microfarads, whereas start capacitors may have typical capacitance values up to about 300 microfarads. Such high start capacitance values have generally been achieved with electrolytic capacitors because 300-microfarad capacitors with typical film thicknesses would be bulky and require a large container that may not fit into the space provided in an air conditioning unit or the like. However, with recognition that a start capacitor is utilized for about one second or less as the motor starts, it does not have to be rated at high voltage over a long period of time. Therefore, a thin film may be used and the required capacitance is attained in a reasonably sized capacitive element. A further advantage is that the resultant metallized film capacitive element has stable capacitance values over a relatively wide ambient temperature range, and also has a long service life.

Figure 3:
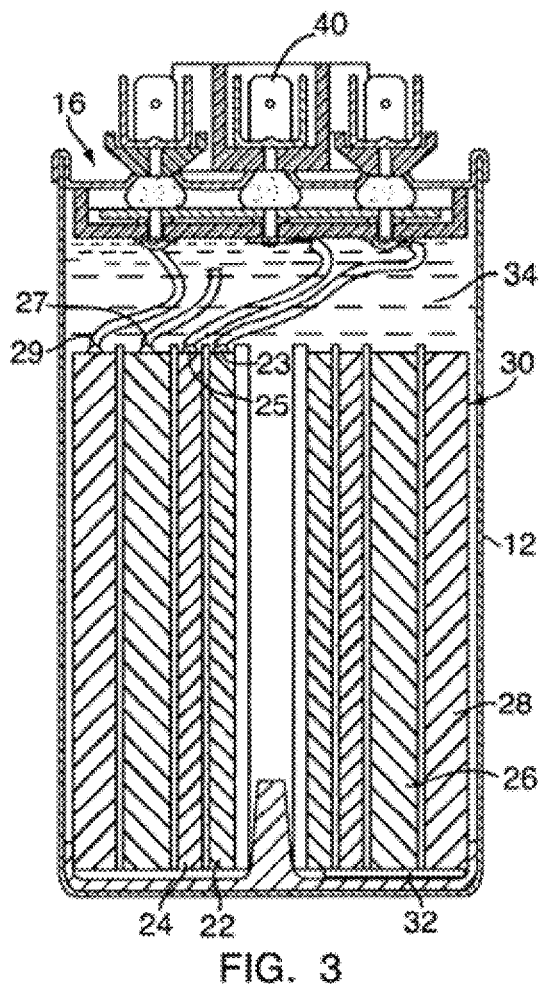
FIG. 3 is a sectional view of the capacitor, capacitor container and cover of the hard start capacitor replacement unit of FIG. 1.

The container is preferably filled with a dielectric fluid 34 and the cover 16 is provided with circuit interruption protection in the event the capacitive element fails, such as shown in FIG. 3 and described in U.S. Pat. No. 7,203,053. These are also advantages in fabricating the capacitors 22, 24, 26 and 28 for the hard start capacitor replacement unit 10 from metallized film.

Although it is preferable to provide the capacitors in a cylindrical capacitive element 30 wound of metallized film, the capacitors 22, 24, 26, 28 may be individual wound capacitors having respective ends electrically connected to form a common terminal. The capacitive element 30 may be provided with more or less than four capacitors if desired. The capacitors may also be provided as two or more capacitive elements each having multiple capacitors.

It is also contemplated to make a hard start capacitor replacement unit with a single multiple value electrolytic capacitor or multiple electrolytic capacitors that may be connected to provide selectable total capacitance values. However, according to present electrolytic capacitor technology, the container for such a capacitor or capacitors would necessarily be larger than the container for a metallized film capacitive element and the capacitance value would not be as stable over ambient temperature ranges.

In the hard stand capacitor replacement unit 10 shown and described herein, capacitor 22 has terminal 23 and preferably has a capacitance of 48 microfarads. Capacitor 24 has terminal 25, and also has a capacitance value of 48 microfarads. Capacitor 26 has capacitor terminal 27, and has a value of 88 microfarads, and capacitor 28 has capacitor terminal 29 and has a value of 112 microfarads.

As perhaps as best seen in FIGS. 5-8, the cover 16 mounts a common cover terminal 40 in the center thereof, and mounts capacitance value terminals 42, 44, 46 and 48 spaced apart from the common cover terminal 40 and from each other. The common cover terminal 40 is connected to common element terminal 32 of the capacitive element 30 and thereby to each of the capacitors 22, 24, 26 and 28. The capacitance value cover terminal 42 is connected with the terminal 23 of capacitor 22 and the capacitance cover terminal 44 is connected with the capacitor terminal 25 of capacitor 24. The capacitance cover terminal 46 is connected with the capacitor terminal 27 of capacitor 26 and capacitance value cover terminal 48 is connected with the capacitor terminal 29 of the capacitor 28. Therefore, the capacitance values of the capacitors 22, 24, 26, 28 are respectively available for wire connections at the corresponding capacitance value cover terminals 42, 44, 46, 48 on the cover 16 of container 12.

A cover insulation barrier 50 is also mounted to the cover 16 to better isolate the cover terminals. The cover insulation barrier 50 has a cylindrical portion 52 surrounding the common cover terminal 40 and has radial extending fins 54-58 that separate the other capacitance value cover terminals. An extra fin is shown, which would insulate another one or two cover terminals if an additional one or two capacitors were provided.

Figure 4:
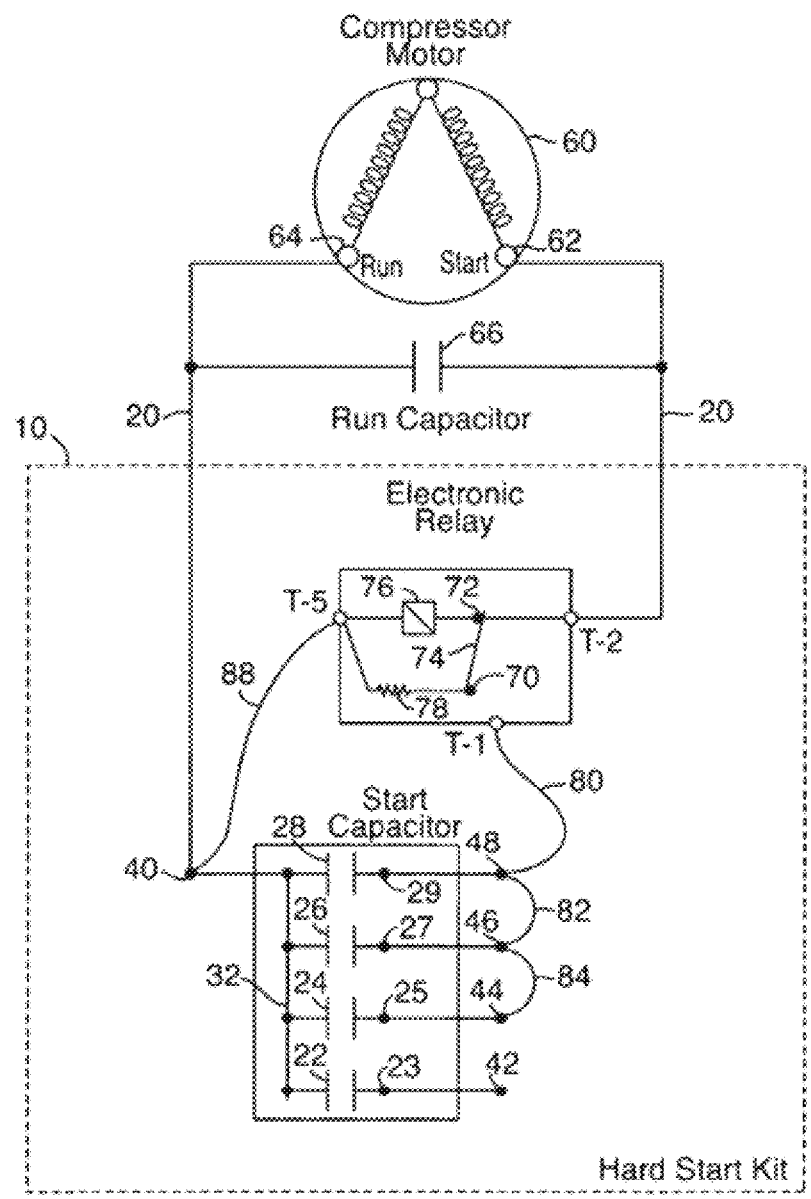
FIG. 4 is a schematic circuit diagram of the hard start capacitor replacement unit of FIG. 1, shown connected to a motor.

With reference to FIG. 4, a schematic of the operation of the start capacitor replacement unit 10 is shown. The electronic relay 18 has external terminals that accept wire termination clips, so that wire connections can be made between the common cover terminal 40, and the capacitance value cover terminals 42, 44, 46 and 48, as well as with the start and run terminals 62 and 64 of a motor 60. External terminals T-1 and T-2 of electronic relay 18 are internally connected with contacts 70 and 72 that may be closed by a contact bar 74, all schematically shown. The electronic relay 18 also has external terminal T-5, and the electronic relay 18 has circuitry indicated at 76 that monitors the voltage and the dv/dt between terminals T-2 and T-5 and controls the opening and closing of the contacts 70 and 72 in response thereto. Terminals T-2 and T-5 are connected to the start and run terminals 62 and 64 of compressor motor 60 by wires 20, so that the electronic relay is monitoring the voltage across the start and run windings. Terminal T-5 may also be connected between the start and run windings of motor 60. When the contacts 70 and 72 are closed, the electronic relay 18 connects the selected ones of the capacitors 22, 24, 26 and 28 across the terminals 62 and 64 in parallel with the run capacitor 66 to assist in starting the motor. A bleeder resister 78 discharges the capacitor(s) when contacts 70, 72 are open. A suitable electronic relay is available from Zhejiang Hongli Electric Co., Part No. HLR3800-6AM1D.

Figure 9:
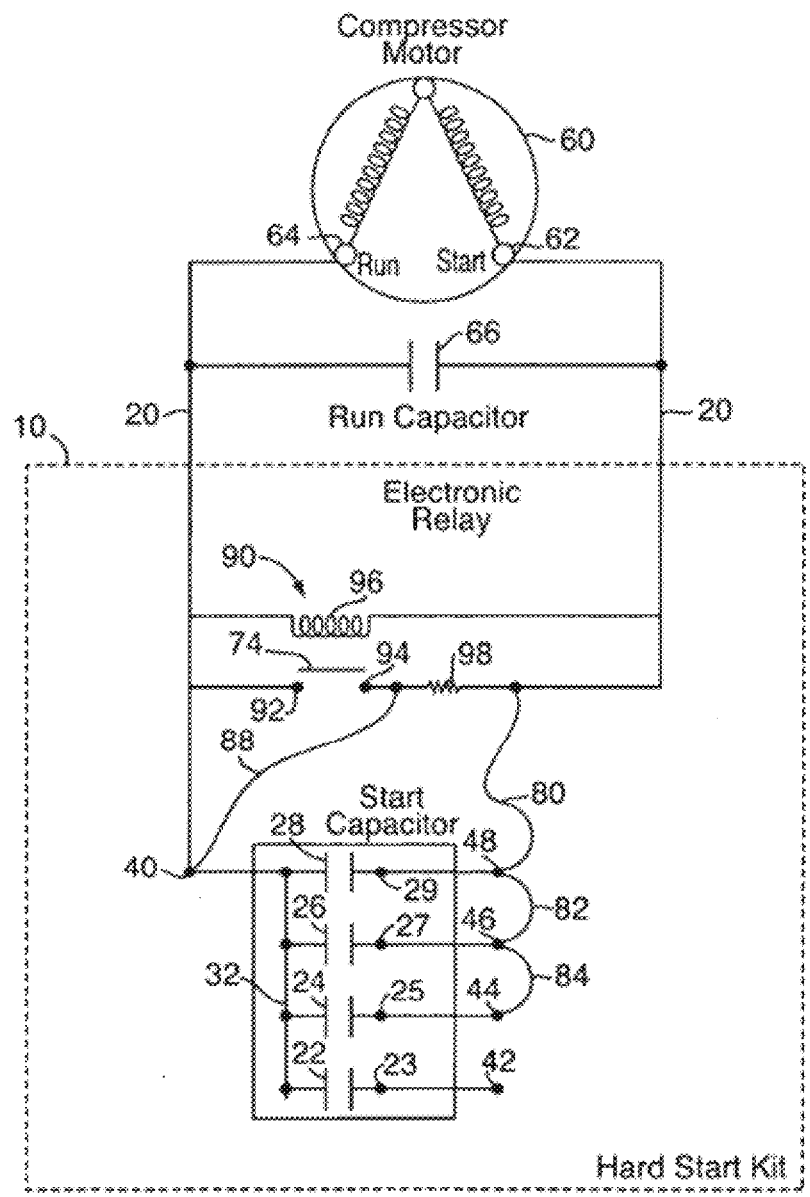
FIG. 9 is a schematic circuit diagram of another hard start capacitor replacement unit according to the invention, shown connected to a motor.

With reference to FIG. 9, the hard start capacitor replacement unit 10 may also be used with a control or potential relay 90 as shown in the schematic. The relay contacts 92 and 94 are closed by contact bar 74 to connect selected ones of capacitors 22, 24, 26, 28 across run terminals 62, 64 of motor 60, and contacts 92, 94 are opened by coil 96 when the motor 60 starts. Bleeder resister 98 is provided to bleed off the capacitor charge when the contacts 92, 94 are open.

It will also be appreciated that although the capacitors of the hard start unit 10 are shown connected across motor terminals 62, 64, the purpose of this connection is to connect the capacitors in parallel with the motor run capacitor of the motor, and any connection that accomplishes this is suitable.

Figure 8:
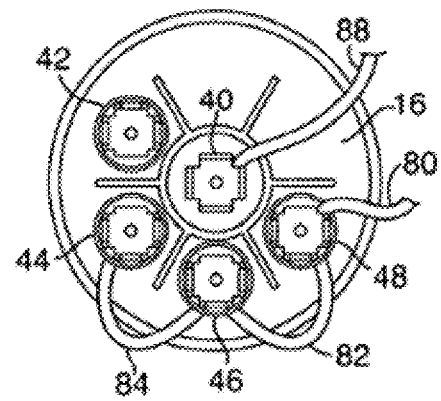
FIG. 8 is a top view of the cover and cover terminals of the hard start capacitor replacement unit of FIG. 1 showing the capacitors connected to provide a fourth capacitance value.

In FIG. 4, the capacitors 22, 24, 26 and 28 are connected as also shown in FIG. 8, in which a first wire 80 connects T-1 of the electronic relay with the cover capacitance value terminal 48, which selects 112 microfarads of capacitance value. Jumper wire 82 between capacitance value terminals 48 and 46 connects an additional 88 microfarads of capacitance value into the circuit. Wire 88 connects the common terminal 40 to terminal T-5 of the electronic relay 18. Jumper wire 84 connecting capacitance value cover terminal 46 and capacitance value cover terminal 44 connects a further 48 microfarads into the circuit. Thus, in the configuration shown in FIGS. 4 and 6, a total capacitance of 248 microfarads is provided to start the motor 60 when the contacts of the electronic relay 18 are closed.

Figure 5:
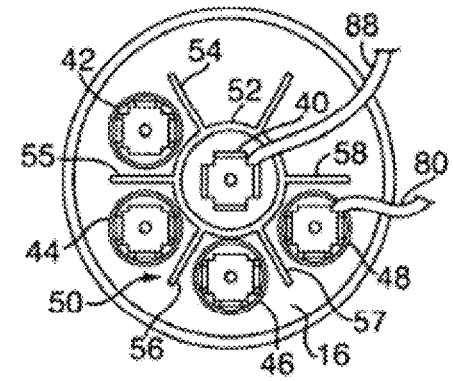
FIG. 5 is a top view of the cover and cover terminals of the hard start capacitor replacement unit of FIG. 1, showing the capacitors connected to provide a first capacitance value.
Figure 6:
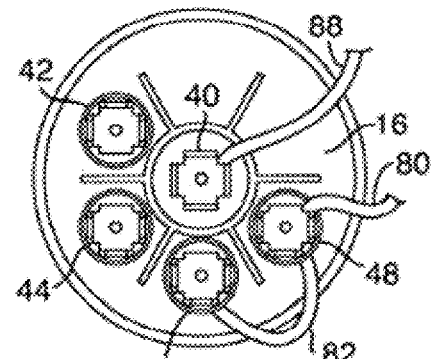
FIG. 6 is a top view of the cover and cover terminals of the hard start capacitor replacement unit of FIG. 1, showing the capacitors connected to provide a second capacitance value.
Figure 7:
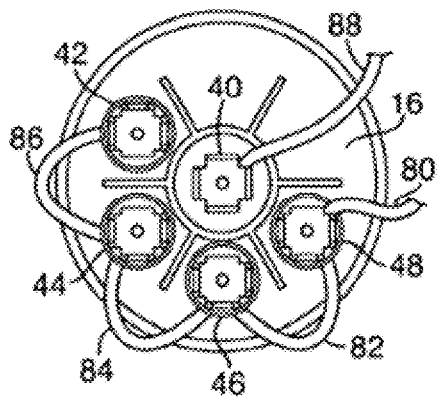
FIG. 7 is a top view of the cover and cover terminals of the hard start capacitor replacement unit of FIG. 1, showing the capacitors connected to provide a third capacitance value.

It will be appreciated that a variety of capacitance values may be selected by connecting various ones of the capacitance cover terminals to each other. Some preferred connections are shown in FIGS. 5-8. FIG. 5 shows connection of capacitor 28 by wire 80 at cover terminal 48 providing 112 microfarads, which is suitable for use where capacitance values in the range 108-130 microfarads are desired for the motor start. FIG. 6 shows connection of capacitors 26 and 28 by jumper wire 82 at cover terminals 46 and 48 providing 200 microfarads of capacitance value, which is suitable for desired capacitance values in the range of 189-227 microfarads. FIG. 7 shows all of the capacitors 22, 24, 26, 28 connected into the circuit at cover terminals 42, 44, 46 and 48 by jumper wires 82, 84 and 86 to provide a total 296 microfarads, which is suitable for use in applications requiring capacitance values in the range of 270-324 microfarads. FIG. 8 shows connection of capacitors 28, 26 and 24 by jumper wires 82 and 84 providing 248 microfarads, for use with applications requiring capacitance values of 233-280 microfarads.

If desired, the total capacitance values connected into the circuit can be further refined with possible capacitance values of 48 microfarads, 88 microfarads, 96 microfarads, 136 microfarads, 160 microfarads, 184 microfarads and 208 microfarads, being available in addition to the 112 microfarads, 200 microfarads, 240 microfarads and 296 microfarads configurations shown above.

Once the desired capacitance value is selected by placing appropriate jumper wires on the cover terminals, the cap 14 may be fitted over the container 12, to surround the cover terminals and electronic relay 18. The hard start capacitor replacement unit 10 has a suitable size and shape to be accommodated in the space provided for the original start capacitor, so the hard start replacement unit 10 is readily accepted for mounting in existing equipment.

As a result of the foregoing, a repairman can carry the hard start capacitor replacement unit 10 to repair site with confidence that a failed start capacitor unit can be replaced without need to return to a shop or parts distributor in order to complete the repair.

Figure 10:
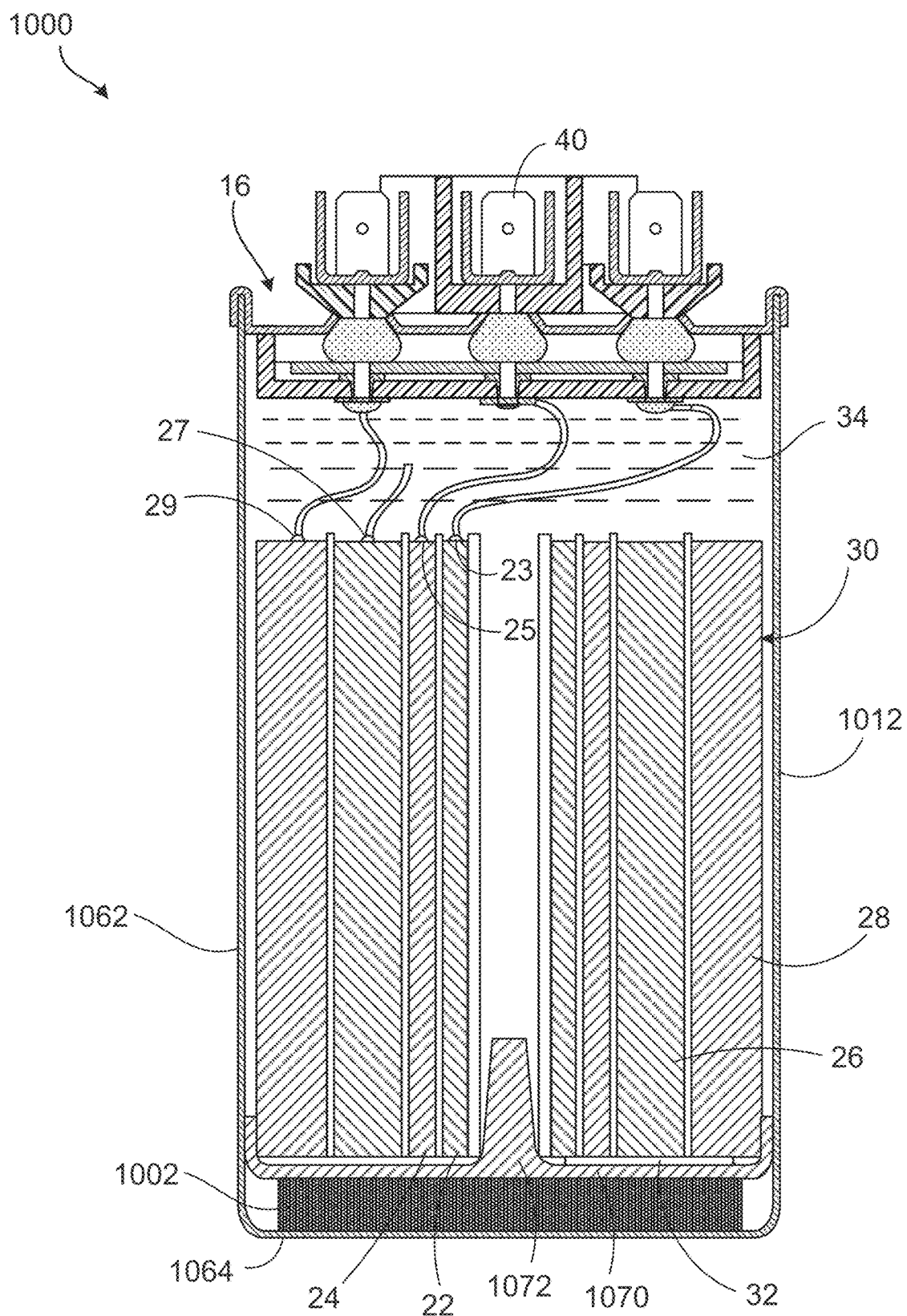
FIG. 10 is a sectional view of an example of a hard start capacitor replacement unit and a magnet.

Another hard start capacitor replacement unit 1000 according to the invention herein is illustrated in FIG. 10. The hard start capacitor replacement unit 1000 may have the same or similar external appearance and functionality as hard start capacitor replacement unit 10, and may be adapted to replace any one of a large number of capacitors with the hard start capacitor replacement unit 1000 connected to provide the same capacitance value or values of a failed capacitor.

The hard start capacitor replacement unit 1000 may include one or more magnetic elements for assisting in mounting of the hard start capacitor replacement unit 1000 (e.g., to an air conditioning system). In the illustrated example, a magnet 1002 is positioned toward a bottom end of the hard start capacitor replacement unit 1000. In particular, the magnet 402 is positioned between a bottom wall 1064 of a case 1012 (e.g., sometimes referred to as a container) of the hard start capacitor replacement unit 1000 and a bottom cup 1070 of the hard start capacitor replacement unit 1000 (e.g., beneath a center post 1072 of the bottom cup 1070). The magnet 1002 is configured to create magnetic attraction between the magnet 1002 and a magnetic surface in proximity to the hard start capacitor replacement unit 1000. For example, the magnet 1002 may cause the bottom wall 1064 of the case 1012 to be attracted to a metallic surface of an air conditioning system, thereby improving the integrity of a mounting between the hard start capacitor replacement unit 1000 and the air conditioning system after installation. The magnet 1002 may be designed such that the strength of magnetic attraction between the magnet 1002 and the air conditioning system is such that the magnet 1002 may remain firmly in place in response to possible vibration and/or other movement of the air conditioning system during operational use. In some implementations, the strength of magnetic attraction between the magnet 1002 and the air condition system is such that a user (e.g., a technician installing or uninstalling the hard start capacitor replacement unit 1000) can remove the hard start capacitor replacement unit 1000 from the surface of the air conditioning system without requiring excessive effort.

While the magnet 1002 is illustrated as being positioned interior to the case 1012 of the hard start capacitor replacement unit 1000, in some implementations, the magnet 1002 may be positioned outside of the case 1012 on an exterior of the bottom wall 1064 of the case 1012. For example, the magnet 1002 may have a disk shape that is positioned outside of the case 1012 at an outer surface of a base of the case 1012.

In some examples, the magnet 1002 may have a rectangular shape. For example, the magnet 1002 may be a rectangular strip that runs along the bottom wall 1064 of the case 1012 of the hard start capacitor replacement unit 1000. In particular, the rectangular strip may have a particular thickness, a first dimension that runs from the left side of the hard start capacitor replacement unit 1000 to the right side of the hard start capacitor replacement unit 1000 as illustrated in FIG. 10, and a second dimension that is perpendicular to the first dimension and smaller than the first dimension. In some implementations, the magnet 1002 may have a square shape (e.g., such that the first dimension is equal to or substantially equal to the second dimension). In some implementations, the magnet 1002 may have a rod shape. In some implementations, the magnet 1002 may have a circular shape (e.g., a disk shape) or a hollow circular shape (e.g., a ring shape). For example, in some implementations, the magnet 1002 may have dimensions equal to or substantially equal to the dimensions of a disk-shaped battery (e.g., a watch battery such as a CR2032 battery). In some implementations, the magnet 1002 is a disk-shape with a thickness of approximately 4 mm and a diameter of approximately 160 mm. In some implementations, the magnet 1002 is a disk-shape with a thickness of approximately 4 mm and a diameter of approximately 40 mm. In some implementations, the magnet 1002 is a disk-shape with a thickness of approximately 4.5-5 mm and a diameter of about 60 mm. In some implementations, the magnet 1002 is a disk-shape with a thickness of approximately 5 mm and a diameter of about 60 mm.

The particular shape and/or dimensions of the magnet 1002 may be chosen to achieve the desired strength of magnetic attraction. For example, the magnet 1002 may be designed with a particular shape and/or larger dimensions and/or larger thicknesses to achieve a relatively higher strength of magnetic attraction with a magnetic surface. In some implementations, increased surface area of the magnet 1002 toward the bottom wall 1064 of the case 1012 of the hard start capacitor replacement unit 1000 may increase the strength of magnetic attraction.

In some implementations, the magnet 1002 has a strength of approximately 30-40 milliTeslas (mT) or a strength of approximately 65-75 mT. In some implementations, the strength of magnetic attraction can be increased by stacking multiple magnets 1002 (e.g., on top of each other). In some implementations, two stacked magnets 1002 can have a strength of approximately 70-80 mT, 60-80 mT, or 130-150 mT, although other ranges are also possible. In some implementations, the magnet 1002 may be a D40x4 ferrite ceramic magnet manufactured by Hangzhou Honesun Magnet Co., Ltd.

In some implementations, the magnet 1002 may be magnetized using one or more of a plurality of techniques. For example, in some implementations, the magnet 1002 may be magnetized such that a north and a south pole of the magnet 1002 is located at a particular position of the magnet 1002. For example, the techniques for magnetizing the magnet 1002 may cause the north and/or south pole to be located at various thicknesses of the magnet 1002, various axial positions of the magnet 1002, various diametric positions of the magnet 1002, and/or various radial positions of the magnet 1002. In some implementations, the magnet 1002 may be a multi-pole magnet.

In some implementations, the magnet 1002 is a permanent magnet that is made from a material that is magnetized and creates its own persistent magnetic field. For example, the magnet 1002 may be made from a ferromagnetic material that can be magnetized, such as iron, nickel, cobalt, and/or an alloy of rare-earth metals, among others. In some implementations, the magnet 1002 is a ferrite and/or ceramic magnet. In some implementations, the magnet 1002 may include one or more of ferric oxide, iron oxide, barium, barium carbonate, strontium, and/or strontium carbonate. The magnet 1002 may include one or more magnetically "hard" materials (e.g., materials that tend to stay magnetized). Alternatively or additionally, the magnet 1002 may include one or more magnetically "soft" materials.

In some implementations, the magnet 1002 may be a rare-earth magnet. A rare-earth magnet is typically a relatively strong permanent magnet that is made from one or more alloys of rare-earth elements. Example of rare-earth elements that can be used in a rare-earth magnet include elements in the lanthanide series, scandium, and yttrium, although other elements may also or alternatively be used. In some implementations, the rare-earth magnet may produce a magnetic field of greater than 1.0 T (teslas). In some implementations, the rare-earth magnet may include one or both of samarium-cobalt and neodymium.

In some implementations, the magnet 1002 may be made from one or more ceramic compounds (e.g., ferrite) that can be produced by combining iron oxide and one or more metallic elements. In some implementations, such ceramic compounds may be electrically nonconductive. The use of such ceramic compounds for the magnet 1002 may eliminate the inclusion of electrically conductive elements in the hard start capacitor replacement unit 1000 that may otherwise affect the operation of the hard start capacitor replacement unit 1000.

In some implementations, the magnet 1002 may have a grade that corresponds to a particular standard (e.g., a National and/or International standard). In some implementations, the grade of the magnet 1002 corresponds to the Chinese ferrite magnet nomenclature system. For example, in some implementations, the magnet 1002 is grade Y10T, Y25, Y30, Y33, Y35, Y30BH, or Y33BH, although other grades are also possible. In some implementations, the grade corresponds to a working temperature of 250° C. In some implementations, the grade of the magnet 1002 corresponds to a Feroba, an American (e.g., "C"), or a European (e.g., "HF") grading standard.

In some implementations, the magnet 1002 may be an electromagnet that produces a magnetic field by introducing an electric current. In some implementations, the electromagnet may include a magnetic core and a wire (e.g., an insulated wire) wound into a coil around the magnetic core. The magnetic core may be made from a ferromagnetic or a ferrimagnetic material such as iron or steel. The magnetic core may be made from a "soft" magnetic material (e.g., a magnetic material that can allow magnetic domains in the material to align upon introduction of the current through the coil).

By using an electromagnet as the magnet 1002, the strength of magnetic attraction can be turned on and off and/or customized according to the current passed through the coil. For example, current can be applied through the coil to cause the electromagnet to generate a magnetic field, and the current can be removed from the coil to cause the electromagnetic to cease generating the magnetic field. In some implementations, the strength of the magnetic field (and, e.g., the strength of magnetic attraction created by the electromagnet) can be adjusted based on the magnitude of electrical current passed through the coil. For example, relatively higher magnitudes of electrical current correspond to higher magnetic field strengths and therefore higher strengths of magnetic attraction (e.g., with a magnetic surface), and relatively lower magnitudes of electrical current correspond to lower magnetic field strengths and therefore lower strength of magnetic attraction.

In some implementations, the particular material used for the core of the electromagnet and/or the dimensions of the core may be chosen to achieve the desired strength of magnetic attraction. The core may be made from a material such as one or both of iron and steel. In some implementations, the dimensions of the coil and/or the number of turns of the coil may also be chosen to achieve the desired strength of magnetic attraction.

In some implementations, the current that is provided through the coil may be provided by a connection with one or more of the capacitance value terminals 42, 44, 46, 48 and the common cover terminal 40 of the hard start capacitor replacement unit 1000. For example, a conductor (e.g., a wire) may be used to connect one or more of the capacitance value terminals 42, 44, 46, 48 to a first end of the coil and a conductor may be used to connect another one of the capacitance value terminals 42, 44, 46, 48 or the common cover terminal 40 to a second end of the coil. In this way, the current that otherwise runs through the electrical components of the hard start capacitor replacement unit 1000 can also be used to power the electromagnetic, thereby causing the electromagnet to generate a magnetic field.

In some implementations, the hard start capacitor replacement unit 1000 may include one or more different and/or additional electrical components that can be used by the electromagnet to generate the magnetic field. For example, the hard start capacitor replacement unit 1000 may include a separate capacitor that is configured to store a charge to be used to subsequently apply current through the coil of the electromagnetic. In this way, the electromagnet may have a separate power source that can be used when generation of a magnetic field is desired.

In some implementations, the hard start capacitor replacement unit 1000 may include a switch that can be toggled by a user (e.g., a technician or an operator of the hard start capacitor replacement unit 1000) to cause the electromagnetic to generate or cease generating the magnetic field. The switch may cause an electrical connection in the coil to be temporarily broken and restored. In some implementations (e.g., implementations in which the coil is connected to one or more of the capacitance value terminals 42, 44, 46, 48 and/or the common cover terminal 40), the switch may cause the conductor that connects the coil to one or more of the capacitance value terminals 42, 44, 46, 48 and/or the conductor that connects the coil to the common cover terminal 40 to be temporarily broken and restored, such that the magnetic field generated by the electromagnet can be toggled on and off. In this way, the user can toggle the magnetic field on when mounting of the hard start capacitor replacement unit 1000 is desired (e.g., at the time of installation) and toggle the magnetic field off when mounting of the hard start capacitor replacement unit 1000 is not desired (e.g., when the hard start capacitor replacement unit 1000 is not in use and/or being stored) or when magnetic attraction is not desired (e.g., when mounting the hard start capacitor replacement unit 1000 at a location that does not include a magnetic surface).

In some implementations, the capacitive element of the hard start capacitor replacement unit 1000 and/or the capacitors of the hard start capacitor replacement unit 1000 may be used to store the charge that is provided to the coil to cause the magnetic field to be generated. For example, the capacitive element 30 and/or one or more of the capacitors 22, 24, 26, 28 may be configured to store a charge that is subsequently provided to the coil of the electromagnetic. In this way, electrical charge that is otherwise stored by the hard start capacitor replacement unit 1000 during typical use can also be used to power the electromagnet.

While the hard start capacitor replacement unit 1000 shown in the illustrated example includes one magnet 1002, additional magnets may also be provided. For example, a plurality of magnets 1002 may be positioned between the bottom wall 1064 of the case 1012 of the hard start capacitor replacement unit 1000 and the bottom cup 1070 of the hard start capacitor replacement unit 1000. The plurality of magnets 1002 may have dimensions that are relatively smaller than dimensions that may be chosen for implementations in which only a single magnet 1002 is used. The plurality of magnets 1002 may have dimensions substantially similar to dimensions of a watch battery, such as a CR2032 battery. The plurality of magnets 1002 may be positioned at various locations at the bottom wall 1064 of the case 1012. For example, the plurality of magnets 1002 may be arranged in a ring around a perimeter of the bottom wall 1064 such that the plurality of magnets 1002 are spaced approximately equidistant from one another. In some implementations, the plurality of magnets 1002 may be arranged in groups of two, three, etc. magnets 1002. Any number of magnets 1002 may be provided to achieve the desired strength of magnetic attraction.

In some implementations, the hard start capacitor replacement unit 1000 includes two magnets 1002 positioned between the bottom wall 1064 of the case 1012 and the bottom cup 1070. In some implementations, the two magnets 1002 are each circular shape (e.g., disk shaped). The two magnets 1002 may have a stacked configuration such that a first disk shaped magnet is stacked on top of a second disk shaped magnet. In some implementations, the two magnets 1002 may have a combined strength of approximately 70-80 mT, 60-80 mT, or 130-150 mT, although other ranges are also possible. The two magnets 1002 may have the same or different diameters. In some implementations, the two magnets 1002 may be positioned at a location that is misaligned with a center of the bottom wall 1064 of the case 1012. For example, the center of the magnets 1002 may be misaligned with the center of the bottom wall 1064 of the case 1012 such that the magnets 1002 are positioned proximate to a side wall 1062 of the case. In some implementations, the center of the magnets 1002 may be aligned with the center of the bottom wall 1064 of the case 1012. In some implementations, the centers of the two magnets 1002 may be misaligned relative to each other. In other words, a center of one of the magnets may be misaligned with a center of the other magnet.

Figure 11:
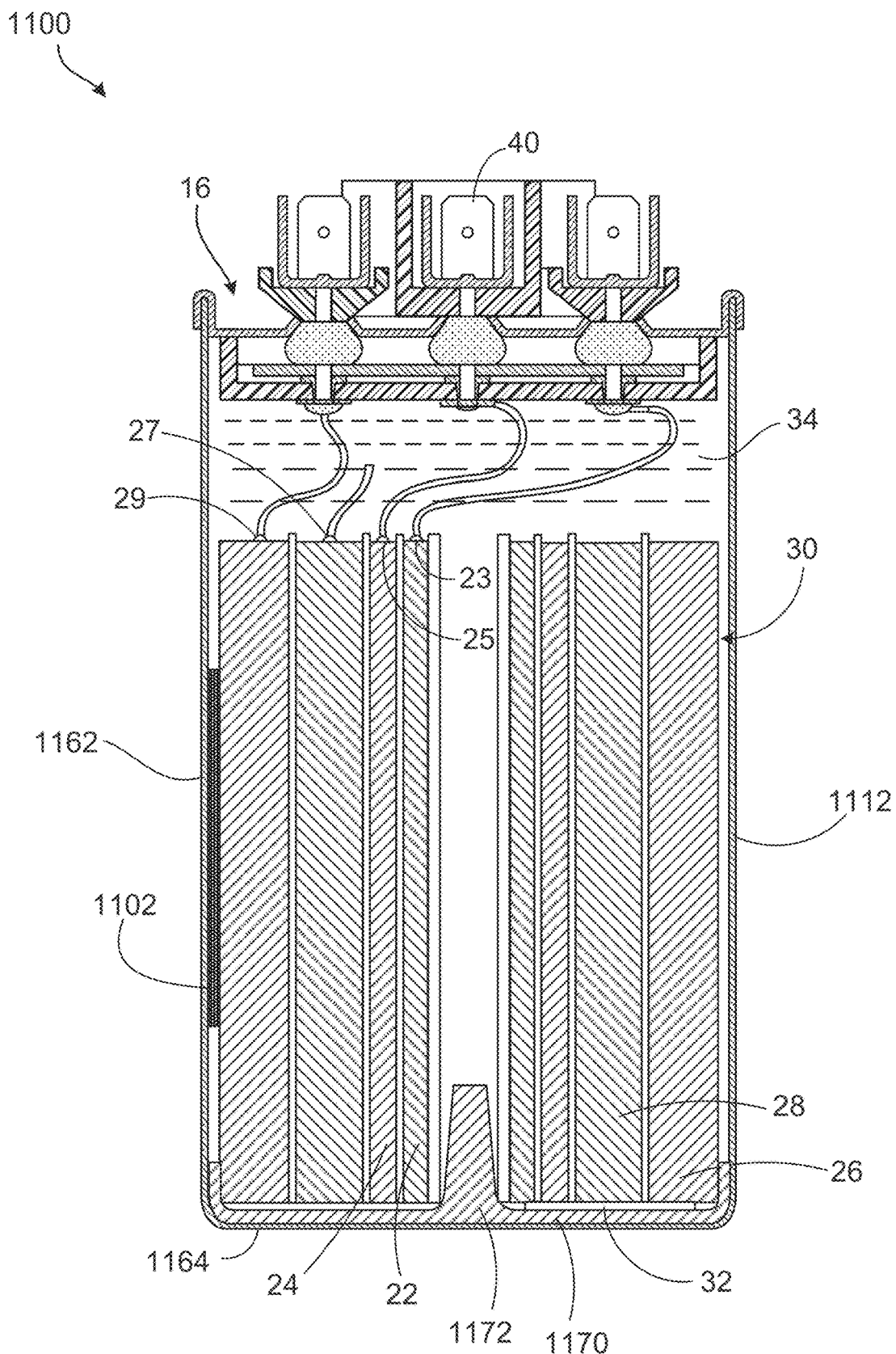
FIG. 11 is a sectional view of an example of a hard start capacitor replacement unit and a magnet.

Another hard start capacitor replacement unit 1100 according to the invention herein is illustrated in FIG. 11. The hard start capacitor replacement unit 1100 may have the same or similar external appearance and functionality as hard start capacitor replacement unit 10 and 1000, and may be adapted to replace any one of a large number of capacitors with the hard start capacitor replacement unit 1100 connected to provide the same capacitance value or values of a failed capacitor.

The hard start capacitor replacement unit 1100 may include one or more magnets for assisting in mounting of the hard start capacitor replacement unit 1100 (e.g., to an air conditioning system). In the illustrated example, a magnet 1102 is positioned inside a side wall 1162 of a case 1112 (e.g., sometimes referred to as a container) of the hard start capacitor replacement unit 1100. The magnet 1102 is configured to create magnetic attraction between the magnet 1102 and a magnetic surface in proximity to the hard start capacitor replacement unit 1100. For example, the magnet 1102 may cause the side wall 1162 of the case 1112 to be attracted to a metallic surface of an air conditioning system, thereby improving the integrity of a mounting between the hard start capacitor replacement unit 1100 and the air conditioning system after installation. The magnet 1102 may be designed such that the strength of magnetic attraction between the magnet 1102 and the air conditioning system is such that the magnet 1102 may remain firmly in place in response to possible vibration and/or other movement of the air conditioning system during operational use. In some implementations, the strength of magnetic attraction between the magnet 1102 and the air condition system is such that a user (e.g., a technician installing or uninstalling the hard start capacitor replacement unit 1100) can remove the hard start capacitor replacement unit 1100 from the surface of the air conditioning system without requiring excessive effort.

In some examples, the magnet 1102 may have a rectangular shape. For example, the magnet 1102 may be a rectangular strip that runs from top to bottom along the side wall 1162 of the case 1112 of the hard start capacitor replacement unit 1100. In particular, the rectangular strip may have a particular thickness, a first dimension that runs from the top end of the hard start capacitor replacement unit 1100 to the bottom end of the hard start capacitor replacement unit 1100, and a second dimension that is perpendicular to the first dimension and smaller than the first dimension. In some implementations, the magnet 1102 may have a square shape (e.g., such that the first dimension is equal to or substantially equal to the second dimension). In some implementations, the magnet 1102 may have a rod shape. In some implementations, the magnet 1102 may have a circular shape (e.g., a disk shape) or a hollow circular shape (e.g., a ring shape). For example, in some implementations, the magnet 1102 may have dimensions equal to or substantially equal to the dimensions of a disk-shaped battery (e.g., a watch battery such as a CR2032 battery). In some implementations, other shapes, a combination of shapes, etc. may be employed; for example, various types of curves may be incorporated into one or more magnetic strips (e.g., elongated oval shaped strips). Patterns of magnetic material may used; for example two crossed magnetic strips, a pattern of crosses, circles, etc. may be attached, incorporated into the bottom wall, side wall 1162, etc. of the hard start capacitor replacement unit 1100.

In some implementations, the magnet 1102 may have a curved shape that matches or substantially matches a curve of the case 1112 of the hard start capacitor replacement unit 1100. For example, the magnet 1102 may have a curve that allows the magnet 1102 to make continuous contact with the side wall 1162 of the case 1112 of the hard start capacitor replacement unit 1100. In some implementations, the magnet 1102 may have dimensions of approximately 1 inch×1 inch and a thickness of about ⅒ of an inch. Such a magnet 1102 may be curved such that the magnet 1102 is configured to interface with an inner wall of the case 1112 of the hard start capacitor replacement unit 1100 (e.g., interior to the case 1112).

As described in more detail below, in some implementations, the magnet 1102 (e.g., the curved magnet) may be positioned exterior to the case 1112 of the hard start capacitor replacement unit 1100. In some implementations, a first surface of the magnet 1102 may be curved such that the first surface of the magnet 1102 interfaces with an exterior wall of the case 1112 of the hard start capacitor replacement unit 1100, and a second surface opposite of the first surface may have a substantially flat shape that is configured to interface with a flat surface of a separate object (e.g., a surface or wall of an air conditioning system). In some implementations, multiple curved magnets 1102 may be provided in one or more of the configurations described herein (e.g., including multiple curved magnets, a curved and a non-curved magnet, etc.).

In some implementations, the magnet 1102 may run along (e.g., make continuous contact) with the full perimeter of the side wall 1162 of the case 1112. That is, the magnet 1102 may have a sleeve shape with a diameter that is slightly less than a diameter of the hard start capacitor replacement unit 1100. In this way, substantially all of the side wall 1162 of the case 1112 of the hard start capacitor replacement unit 1100 may be magnetic such that the user can affix any portion of the side wall 1162 of the hard start capacitor replacement unit 1100 to a magnetic surface (e.g., without needing to rotate the hard start capacitor replacement unit 1100 to find a surface that is in line with the magnet 1102, as may be the case in implementations in which a magnet 1102 having a strip shape is used).

The particular shape and/or dimensions of the magnet 1102 may be chosen to achieve the desired strength of magnetic attraction. For example, the magnet 1102 may be designed with a particular shape and/or larger dimensions and/or larger thicknesses to achieve a relatively higher strength of magnetic attraction with a magnetic surface. In some implementations, increased surface area of the magnet 1102 toward the side wall 1162 of the case 1112 of the hard start capacitor replacement unit 1100 may increase the strength of magnetic attraction.

In some implementations, the magnet 1102 has a strength of approximately 30-40 milliTeslas (mT) or a strength of approximately 65-75 mT. In some implementations, the strength of magnetic attraction can be increased by stacking multiple magnets 1102 (e.g., one beside the other). In some implementations, two stacked magnets 1102 can have a strength of approximately 70-80 mT, 60-80 mT, or 130-150 mT, although other ranges are also possible. In some implementations, the magnet 1102 may be a D40x4 ferrite ceramic magnet manufactured by Hangzhou Honesun Magnet Co., Ltd.

In some implementations, the magnet 1102 may be magnetized using one or more of a plurality of techniques. For example, in some implementations, the magnet 1102 may be magnetized such that a north and a south pole of the magnet 1102 is located at a particular position of the magnet 1102. For example, the techniques for magnetizing the magnet 1102 may cause the north and/or south pole to be located at various thicknesses of the magnet 1102, etc. In some implementations, the magnet 1102 may be a multi-pole magnet.

In some implementations, the magnet 1102 is a permanent magnet that is made from a material that is magnetized and creates its own persistent magnetic field. For example, the magnet 1102 may be made from a ferromagnetic material that can be magnetized, such as iron, nickel, cobalt, and/or an alloy of rare-earth metals, among others. In some implementations, the magnet 1102 is a ferrite and/or ceramic magnet. In some implementations, the magnet 1102 may include one or more of ferric oxide, iron oxide, barium, barium carbonate, strontium, and/or strontium carbonate. The magnet 1102 may include one or more magnetically "hard" materials (e.g., materials that tend to stay magnetized). Alternatively or additionally, the magnet 1102 may include one or more magnetically "soft" materials.

In some implementations, the magnet 1102 may be a rare-earth magnet. A rare-earth magnet is typically a relatively strong permanent magnet that is made from one or more alloys of rare-earth elements. Example of rare-earth elements that can be used in a rare-earth magnet include elements in the lanthanide series, scandium, and yttrium, although other elements may also or alternatively be used. In some implementations, the rare-earth magnet may produce a magnetic field of greater than 1.0 T. In some implementations, the rare-earth magnet may include one or both of samarium-cobalt and neodymium.

In some implementations, the magnet 1102 may be made from one or more ceramic compounds (e.g., ferrite) that can be produced by combining iron oxide and one or more metallic elements. In some implementations, such ceramic compounds may be electrically nonconductive. The use of such ceramic compounds for the magnet 1102 may eliminate the inclusion of electrically conductive elements in the hard start capacitor replacement unit 1100 that may otherwise affect the operation of the hard start capacitor replacement unit 1100.

In some implementations, the magnet 1102 may have a grade that corresponds to a particular standard (e.g., a National and/or International standard). In some implementations, the grade of the magnet 1102 corresponds to the Chinese ferrite magnet nomenclature system. For example, in some implementations, the magnet 1102 is grade Y10T, Y25, Y30, Y33, Y35, Y30BH, or Y33BH, although other grades are also possible. In some implementations, the grade corresponds to a working temperature of 250° C. In some implementations, the grade of the magnet 1102 corresponds to a Feroba, an American (e.g., "C"), or a European (e.g., "HF") grading standard.

While the hard start capacitor replacement unit 1100 shown in the illustrated example includes one magnet 1102, additional magnets may also be provided. For example, a plurality of magnets 1102 may be positioned proximate to the side wall 1162 of the case 1112 of the hard start capacitor replacement unit 1100. The plurality of magnets 1102 may have dimensions that are relatively smaller than dimensions that may be chosen for implementations in which only a single magnet 1102 is used. The plurality of magnets 1102 may have dimensions substantially similar to dimensions of a watch battery, such as a CR2032 battery. The plurality of magnets 1102 may be positioned at various locations proximate to the side wall 1162 of the case 1112. For example, the plurality of magnets 1102 may be arranged in a ring around a perimeter of the side wall 1162 such that the plurality of magnets 1102 are spaced approximately equidistant from one another. In some implementations, the plurality of magnets 1102 may be arranged in groups of two, three, etc. magnets 1102. Any number of magnets 1102 may be provided to achieve the desired strength of magnetic attraction.

Like the magnet 1002 described above with respect to FIG. 10, the magnet 1102 illustrated in FIG. 11 can also be an electromagnet that includes a core and a coil wrapped around the core, in which the materials, dimensions, configuration, and/or operating characteristics of the electromagnet can be chosen to achieve the desired strength of magnetic attraction.

In some implementations, the hard start capacitor replacement units 1000, 1100 may be configured to accept the magnet 1002, 1102 after manufacture of the hard start capacitor replacement unit 1000, 1100. For example, the hard start capacitor replacement unit 1000, 1100 may include one or more movable surfaces (e.g., doors or compartments) that can be opened by the user such that the user can place the magnet 1002, 1102 inside the hard start capacitor replacement unit 1000, 1100. In this way, the user can add and/or remove the magnet 1002, 1102 if magnetic attraction is desired or on longer desired. Further, the user can add additional magnets or remove magnets if a lesser strength of magnetic attraction is desired. For example, if a surface to which the hard start capacitor replacement unit 1000, 1100 is mounted is highly magnetic, the strength of magnetic attraction provided by the configuration of the magnets 1002, 1102 may be excessive. As such, the user can remove one or more of the magnets 1002, 1102 from the hard start capacitor replacement unit 1000, 1100 until the desired strength of magnetic attraction is achieved. On the other hand, if a surface to which the hard start capacitor replacement unit 1000, 1100 is mounted is relatively nonmagnetic, the strength of magnetic attraction provided by the configuration of the magnets 1002, 1102 may be too low. As such, the user can add one or more additional magnets to the hard start capacitor replacement unit 1000, 1100 until the desired strength of magnetic attraction is achieved.

In some implementations, a bottom end of the hard start capacitor replacement unit 1000 (e.g., an area proximate to and including the bottom wall 1064 of the case 1012) may be removable from the rest of the case 1012 of the hard start capacitor replacement unit 1000. In some implementations, the bottom end of the hard start capacitor replacement unit 1000 may be attached by threading such that the bottom end of the hard start capacitor replacement unit 1000 may be removed by twisting the bottom end of the hard start capacitor replacement unit 1000 away from the rest of the case 1012. Removing the bottom end of the hard start capacitor replacement unit 1000 may reveal a compartment within which the magnet 1002 (and, e.g., additional magnets) can be placed and/or removed. In some implementations, the side wall 1162 of the case 1112 of the hard start capacitor replacement unit 1100 may include a slidable and/or otherwise openable door that reveals a compartment of the hard start capacitor replacement unit 1100 within which the magnet 1102 (and, e.g., additional magnets) can be placed and/or removed.

In some implementations, the case 1012, 1112 of the hard start capacitor replacement unit 1000, 1100 may be made from a magnetic material (e.g., a metallic material). The magnet 1002, 1102 may be held in place at least in part by magnetic attraction between the magnet 1002, 1102 and the case 1012, 1112. For example, the magnet 1002 may be magnetically attracted to the bottom wall 1064 of the case 1012 of the hard start capacitor replacement unit 1000, and the magnet 1102 may be magnetically attracted to the side wall 1162 of the case 1112 of the hard start capacitor replacement unit 1100. In some implementations, the case 1012, 1112 may be made from a non-magnetic material such as a plastic material. In such implementations, one or more other mechanisms or techniques may be used to fix the magnet 1002, 1102 in place, as described below.

In some implementations, the magnet 1002, 1102 may be affixed to a surface of the hard start capacitor replacement unit 1000, 1100 by one or more mounting mechanisms. For example, one or more brackets may be used to affix the magnet 1002, 1102 to an interior and/or an exterior of the case 1012, 1112. In some implementations, one or more brackets may be used to affix the magnet 1002 to the bottom wall 1064 of the case 1012. In some implementations, a bracket may be positioned around a surface of the magnet 1002, and one or more fasteners may be used to affix the bracket against the bottom wall 1064 of the case 1012. Similarly, one or more brackets may be used to affix the magnet 1102 to the side wall 1162 of the case 1112. In some implementations, a bracket may be positioned around a surface of the magnet 1102, and one or more fasteners may be used to affix the bracket against the side wall 1162 of the case 1112. In some implementations, an adhesive may be used to affix the magnet 1002, 1102 to the bottom wall 1064 of the case 1012 and/or the bottom cup 1070 and the side wall 1162 of the case 1112. In some implementations, the magnet 1002, 1102 may be held sufficiently in place by being wedged between the bottom wall 1064 of the case 1012 and the bottom cup 1070, or by being wedged between the side wall 1162 of the case 1112 and other components of the hard start capacitor replacement unit 1100. In some implementations, magnetic attraction between the magnet 1002, 1102 and other components of the hard start capacitor replacement unit 1000, 1100 (e.g., the case 1012, 1112) may assist in holding the magnet 1002, 1102 in place.

In some implementations, the magnet 1002, 1102 may be held in place at least in part by an epoxy. For example, once the magnet 1002, 1102 is positioned at its desired position within the case 1012, 1112 of the hard start capacitor replacement unit 1000, 1100, an epoxy can be introduced in proximity to the magnet 1002, 1102. Upon curing, the epoxy can provide sufficient strength for holding the magnet 1002, 1102 in its desired mounting location.

In some implementations, a cutout (e.g., a recess) may be provided in which the magnet 1002, 1102 can be seated (e.g., to assist in holding the magnet 1002, 1102 in place at its desired mounting location). The cutout may be provided in the case 1012, 1112 of the hard start capacitor replacement unit 1000, 1100 and/or in the bottom cup 1070 of the hard start capacitor replacement unit 1000. The cutout may provide a ridge that surrounds a perimeter of the magnet 1002, 1102 to keep the magnet 1002, 1102 in place. In this way, the magnet 1002, 1102 is prevented from sliding to other locations within the case 1012, 1112 of the hard start capacitor replacement unit 1000, 1100.

While the magnets 1002, 1102 have been illustrated as being positioned within the case 1012, 1112 of the hard start capacitor replacement unit 1000, 1100, in some implementations, the magnet 1002, 1102 may be mounted to an exterior of the case 1012, 1112. For example, in some implementations, the magnet 1002 may be mounted to a bottom surface of the bottom wall 1064 of the case 1012 of the hard start capacitor replacement unit 1000. The magnet 1002 may have a shape that substantially matches the shape of the bottom surface of the bottom wall 1064. In this way, when the hard start capacitor replacement unit 1000 is mounted to a magnetic object (e.g., an air conditioning system), the hard start capacitor replacement unit 1000 can be positioned flush with the surface of the object. Similarly, in some implementations, the magnet 1102 may be mounted to an outside surface of the side wall 1162 of the case 1112 of the hard start capacitor replacement unit 1100. In some examples, the magnet 1102 may be wrapped around or substantially around the outside surface of the side wall 1162 of the case 1112 such that substantially all outside surfaces of the case 1112 are magnetic. The magnet 1002, 1102 may be mounted using one or more mounting mechanisms, an adhesive, an epoxy, one or more fasteners, etc. In some implementations, the magnet 1002, 1102 may be a magnetic film that is applied to a portion of the case 1012, 1112 of the hard start capacitor replacement unit 1000, 1100. For example, the magnet 1002, 1102 may be a magnetic film applied to the exterior of the case 1012, 1112.

In some implementations, the magnet 1002, 1102 may have a thickness of approximately 4 mm. For example, in implementations in which the magnet 1002 is mounted to the bottom surface of the bottom wall 1064 of the case 1012 of the hard start capacitor replacement unit 1000, a width of approximately 4 mm for the magnet 1002 may provide sufficient strength of magnetic attraction without making the hard start capacitor replacement unit 1000 unwieldy (e.g., by adding excessive height to the hard start capacitor replacement unit 1000). Therefore, the hard start capacitor replacement unit 1000 does not take up excessive volume at its mounting location (e.g., at or within an air conditioning system).

In some implementations, one or more portions of the case 1012, 1112 of the hard start capacitor replacement unit 1000, 1100 are themselves magnetic, and/or the bottom cup 1070 is magnetic. For example, the hard start capacitor replacement unit 1000, 1100 may be designed such that the case 1012, 1112 is made from a magnetic material. In this way, the hard start capacitor replacement unit 1000, 1100 can be mounted in a variety of configurations as required for the particular application. For example, the bottom wall 1064 of the case 1012 of the hard start capacitor replacement unit 1000 and/or the bottom cup 1070 of the hard start capacitor replacement unit 1000 may be made from a magnetic material such that the bottom wall 1064 of the hard start capacitor replacement unit 1000 can be magnetically attracted to a magnetic object, and/or the side wall 1162 of the case 1112 of the hard start capacitor replacement unit 1100 may be made from a magnetic material such that the side wall 1162 of the hard start capacitor replacement unit 1100 may be magnetically attracted to a magnetic object.

While the magnets 1002, 1102 have been illustrated and described as belonging to different hard start capacitor replacement unit 1000, 1100, in some implementations, the magnet 1002 of FIG. 10 and/or the magnet 1102 of FIG. 11 may be incorporated into other hard start capacitor replacement units described herein. For example, in some implementations, the magnet 1102 may also be incorporated into the hard start capacitor replacement unit 1000 (e.g., instead of or in addition to the magnet 1002), and vice versa. In some implementations, one or both of the magnet 1002 and the magnet 1102 may be incorporated into the hard start capacitor replacement unit 10, 1000, 1100.

While many implementations have been described above (e.g., such as the implementations described with respect to FIGS. 10 and 11), other implementations are also possible. In some implementations, the hard start capacitor replacement units described herein (e.g., the hard start capacitor replacement unit 10, 1000, and/or 1100) may include multiple stacked magnets toward the bottom of the hard start capacitor replacement unit (e.g., similar to the hard start capacitor replacement unit 1000 of FIG. 10, and as described above, between the bottom wall 1064 of the case 1012 and the bottom cup 1070). For example, two magnets having a circular shape (e.g. disk shape) may be stacked on top of each other such that the centers of the two magnets are in alignment. In some implementations, the two magnets may be made from one or more ceramic compounds (e.g., ferrite), for example, which can be produced by combining iron oxide and one or more metallic elements.

In some implementations (e.g., in addition to implementations that include the two stacked magnets described above), multiple magnets may be provided at the side wall of the hard start capacitor replacement unit (e.g., the side wall 1062, 1162 of the hard start capacitor replacement unit 1000, 1100). For example, two magnets may be provided inside the side wall 1062, 1162 of the hard start capacitor replacement unit 1000, 1100. The two magnets may have a curved shape (e.g., as described above). In some implementations, each of the curved magnets may be configured to interface with an inner wall of the case 1012, 1112. In some implementations, the curved magnets may have dimensions of approximately 1 inch×1 inch and a thickness of approximately ⅒ of an inch. In some implementations, the two curved magnets are stacked vertically. For example, a first curved magnet may be provided at a first height between the side wall 1062, 1162 of the hard start capacitor replacement unit 1000, 1100 and the capacitive element 30, and a second curved magnet may be provided at a second height (e.g., above or below the first height) between the side wall 1062, 1162 of the hard start capacitor replacement unit 1000, 1100 and the capacitive element 12. In some implementations, each of the curved magnets may run around a full circumference of the side wall 1062, 1162 of the hard start capacitor replacement unit 1000, 1100 (e.g., such that the magnets have a ring or sleeve shape). In some implementations, one of the magnets may run around a full circumference while the other magnet runs around less than an entirety (e.g., a portion) of the circumference. In yet additional implementations, both of the magnets may run around less than an entire circumference (e.g., a portion of the circumference of the side wall 1062, 1162). In some implementations, the two curved magnets are positioned at the same vertical height along the length of the side wall 1062, 1162. In such implementations, the two curved magnets may each run less than the entire circumference of the side wall 1062, 1162. In some implementations, one or both of the two curved magnets may be a rare-earth magnet that includes neodymium.

In some implementations, one or both of the magnets placed inside the side wall 1062, 1162 may be positioned between an inside surface of the side wall 1062, 1162 and a portion of the bottom cup 1070, 1170. For example, one or both of the curved magnets may be positioned between the side wall 1062, 1162 and an up-turned skirt that embraces the capacitive element 30 and spaces the capacitive element 30 from the side wall 1062, 1162 of the case 1012, 1112. In some implementations, the up-turned skirt may run further up the side wall 1062, 1162 an additional length than what is illustrated in the figures (e.g., in FIGS. 10 and 11). The multiple curved magnets may be stacked vertically or located at the same vertical height in a manner similar to that described above.

In some implementations, a liner may be positioned between the two curved magnets and the capacitive element 30. For example, in implementations in which the curved magnets are not positioned between the side wall 1062, 1162 and the up-turned skirt, a liner may be applied over one or both of the curved magnets to separate the curved magnets from the capacitive element 30. The liner may include a non-conductive material or any other material suitable for separating the magnets from the capacitive element 30 (e.g., for minimizing effects of the magnet on the performance of the capacitive element 30 and/or other components). In some implementations, the liner is a plastic adhesive material that can be applied over a surface of one or both of the curved magnets to separate the curved magnets from other components of the hard start capacitor replacement unit 1000, 1100. In some implementations, the liner can assist in holding the one or both of the curved magnets in place at the side wall 1062, 1162 of the hard start capacitor replacement unit 1000, 1100.

In some implementations, one or both of the two curved magnets may be positioned between the bottom cup 1070, 1170 of the hard start capacitor replacement unit 1000, 1100 and the bottom wall 1064, 1164 of the hard start capacitor replacement unit 1000, 1100. For example, one or both of the curved magnets may be placed in a position between the bottom cup 1070 and the bottom wall 1064 of the hard start capacitor replacement unit 1000 shown in FIG. 10. The curved magnets may be placed instead of or in addition to the magnet 1002 of FIG. 10. The one or both of the curved magnets may be positioned in one or more of the configurations described in the preceding paragraphs. For example, the two curved magnets may be stacked vertically (e.g., one on top of the other, with the two curved magnets optionally making contact with one another) or the two curved magnets may be positioned at the same vertical height of the hard start capacitor replacement unit 1000, 1100 (e.g., such that each of the curved magnets runs along less than an entire circumference of the side wall 1062, 1162, or such that each of the curved magnets runs along half of the circumference of the side wall 1062, 1162 such that the sides of the two magnets make contact with each other). As mentioned above, one or more of the curved magnets may be a rare-earth magnet that include neodymium, while the disk shaped magnets may be made from one or more ceramic compounds (e.g., ferrite), although other materials are also possible. In some implementations, the neodymium curved magnets may have a relative higher (e.g., a substantially higher) degree of magnetic attraction as compared to that of the disk shaped ceramic magnets.

While the various disc shapes magnets and curved magnets have largely been described as being placed inside of the case 1012, 1112 of the hard start capacitor replacement unit 1000, 1100, in some implementations, one or more of the magnets described herein may be placed outside of the case 1012, 1112. For example, one or more of the disk shaped magnets may be positioned on a bottom (e.g., outside) surface of the bottom wall 1064, 1164 of the case 1012, 1112. The magnets may be affixed to the outside of the case 1012, 1112 by the strength of magnetic attraction. In some implementations, one or more mounting mechanisms (e.g., brackets), an adhesive, an epoxy, one or more fasteners, etc. may be used to assist in mounting the magnets to the outside of the case 1012, 1112. For example, one or more brackets may be used to mount the one or more magnets to the exterior of the case 1012, 1112. In some implementations, a liner (e.g., such as the liner described above) may be used to assist in mounting the one or more magnets to the case 1012, 1112.

Similarly, one or more of the curved magnets may be positioned on an outside surface of the side wall, 1062, 1162 of the case 1012, 1112. The magnets may be affixed to the outside of the case 1012, 1112 by the strength of magnetic attraction. In some implementations, one or more mounting mechanisms (e.g., brackets), an adhesive, an epoxy, one or more fasteners, etc. may be used to assist in mounting the magnets to the outside of the case 1012, 1112. For example, one or more brackets may be used to mount the one or more magnets to the exterior of the case 1012, 1112. In some implementations, a liner (e.g., such as the liner described above) may be used to assist in mounting the one or more magnets to the case 1012, 1112.

While the curved magnets have been described as having a curved shape that substantially interfaces with the side wall 1062, 1162 of the case 1012, 1112, in some implementations, a first wall of one or more of the curved magnets may have a curved shape that interfaces with the side wall 1062, 1162 of the case 1012, 1112, and an opposite wall (e.g., a wall opposite of the curved wall of the one or more magnet) may have a substantially flat shape. The substantially flat shape may allow the case 1012, 1112 to interface with a flat surface of a separate object (e.g., an air conditioning system). For example, in some implementations, one or more of the curved magnets may be positioned on an exterior of the side wall 1062, 1162 of the case 1012, 1112 (e.g., as described above). The opposite surface of the curved magnet may have a flat shape that can substantially interface with a flat magnetically-attractive surface, such as a metal wall of an air conditioning unit or system. The flat shape of the opposite surface of the one or more magnets may allow the hard start capacitor replacement unit 1000, 1100 to create a sufficient magnetic bond with the air conditioning unit or system, such that the hard start capacitor replacement unit 1000, 1100 cannot become inadvertently dislodged or misaligned from its intended mounting position.

In some implementations, one or more of the curved magnets may be configured to interface with both an outside of the side wall 1062, 1162 of the hard start capacitor replacement unit 1000, 1100 and the bottom wall 1064, 1164 of the hard start capacitor replacement unit 1000, 1100. For example, one or more of the curved magnets may include at least five relevant surfaces: a first curved surface (e.g., inside surface) that is configured to interface with the outside surface of the side wall 1062, 1162, a second flat surface (e.g., inside surface) that is configured to interface with the bottom wall 1064, 1164, and three additional flat surfaces (e.g., outside surfaces) that are configured to interface with one or more mounting location (e.g., of one or more surfaces of an air conditioning unit or system). The inside surfaces can allow the magnet to make intimate contact with the case 1012, 1112 of the hard start capacitor replacement unit 1000, 1100, thereby allowing the one or more magnets to maintain contact with the hard start capacitor replacement unit 1000, 1100 using one or more of the techniques described above. The three outside surfaces may allow the one or more magnets to make intimate contact with a mounting location, such as a corner mounting location that allows a bottom outside surface of the magnet to interface with a bottom mounting location, a first side outside surface perpendicular to the bottom outside surface to interface with a side mounting location, and a second side outside surface perpendicular to the bottom outside surface and the first side surface to interface with another side mounting location, thereby allowing the hard start capacitor replacement unit 1000, 1100 to be mounted in a corner target area while being placed on a bottom surface of the target area.

In some implementations, the magnet may include two outside surfaces (e.g., without a bottom outside surface) that allows the hard start capacitor replacement unit 1000, 1100 to be mounted in a corner target area without the hard start capacitor replacement unit 1000, 1100 necessarily being placed on (e.g., magnetically attracted to) a bottom surface of the mounting area. In this way, the hard start capacitor replacement unit 1000, 1100 can be mounted to a corner target area of an air conditioning unit or system while being suspended (e.g., without being placed on a bottom surface of the mounting area).

As described above, in some implementations, one or more of the curved magnets may be a rare-earth magnet that include neodymium, while the disk shaped magnets may be made from one or more ceramic compounds (e.g., ferrite), although it should be understood that other materials can additional or alternatively be used for any of the magnets described herein. In some implementations, the neodymium curved magnets may have a relatively higher (e.g., a substantially higher) degree of magnetic attraction as compared to that of the disk shaped ceramic magnets. Such a configuration may, for example, provide additional magnetic mounting strength for implementations in which the hard start capacitor replacement unit 1000, 1100 is side mounted (e.g., mounted to a side surface of a target mounting location without the bottom wall 1064, 1164 of the case 1012, 1112 making contact with a bottom surface of the mounting location), sometimes referred to herein as a suspended mounting configuration. The relatively higher degree of magnetic attraction provided by one or more of the curved magnets may allow the hard start capacitor replacement unit 1000, 1100 to be mounted in such configurations without becoming dislodged or misplaced from the target location. For example, the relatively higher degree of magnetic attraction may prevent the hard start capacitor replacement unit 1000, 1100 from sliding down a wall of the mounting location due to the effects of gravity. In contrast, in implementations in which the bottom wall 1064, 1164 of the hard start capacitor replacement unit 1000, 1100 is mounted to a bottom surface of the target mounting location (e.g., on a bottom surface of an air conditioning unit or system), such additional strength of magnetic attraction may not be necessary to maintain the capacitor hard start capacitor replacement unit 1000, 1100 in proper mounting configuration. Nonetheless, additional curved magnets may also be included to provide additional and/or redundant magnetic attraction for mounting purposes.

Figure 12A:
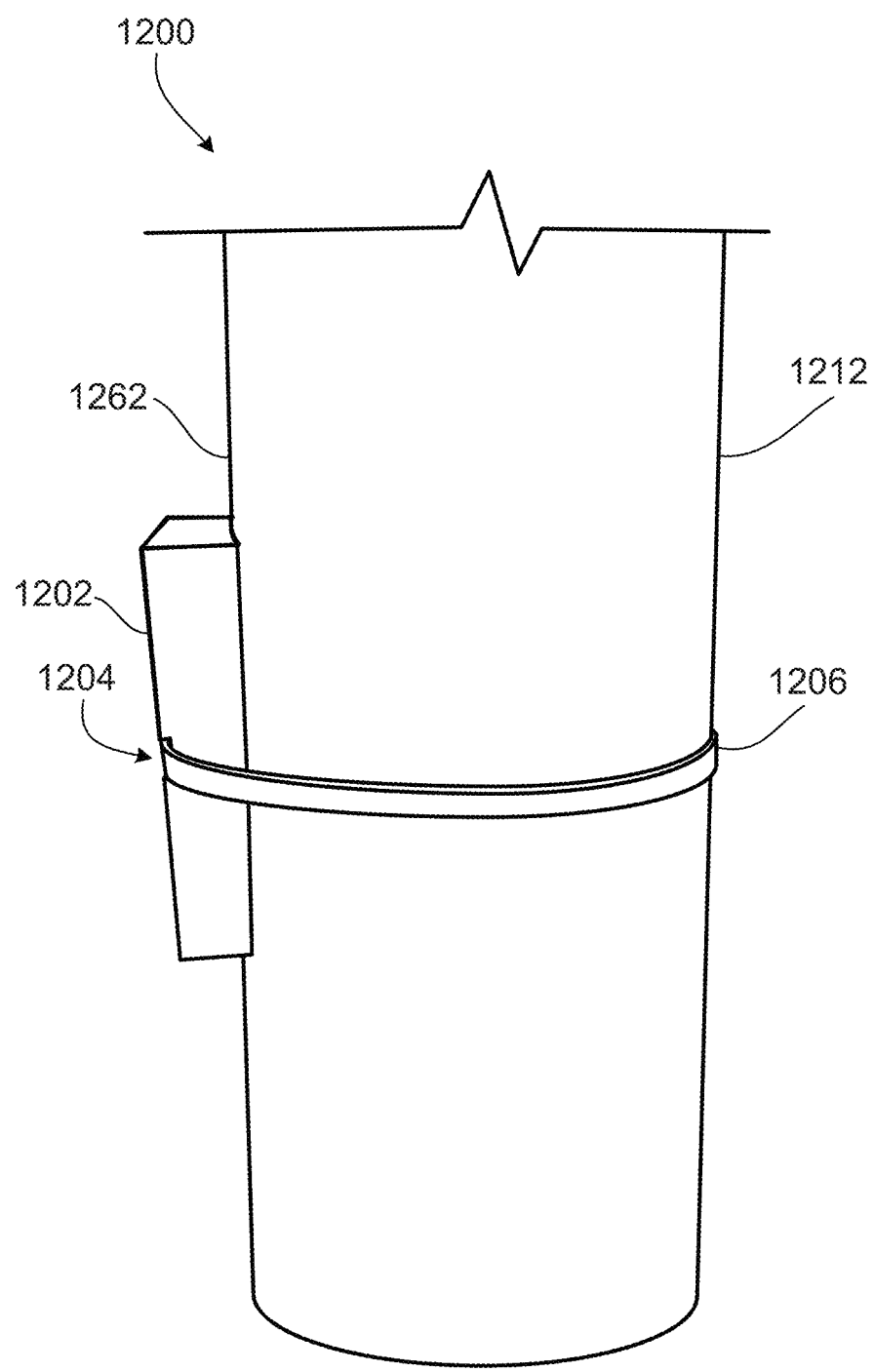
FIG. 12A shows an example of a hard start capacitor replacement unit and a magnet.
Figure 12B:
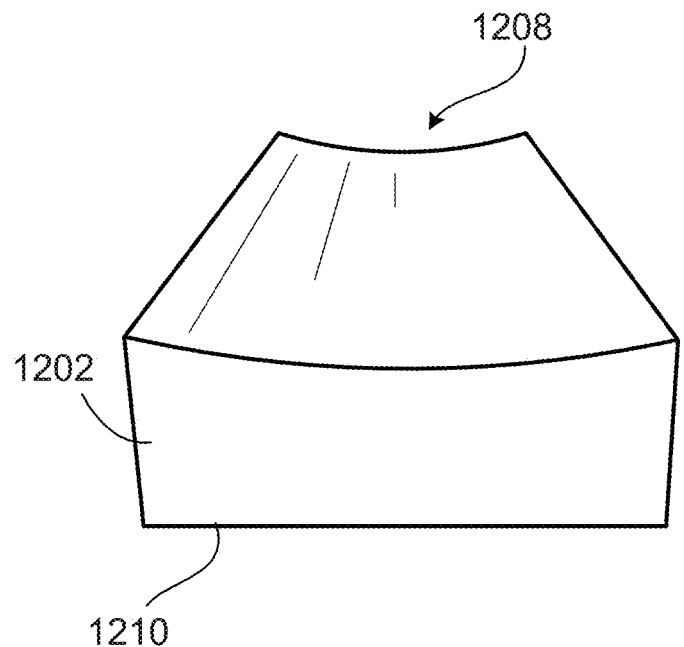
FIGS. 12B and 12C show the magnet of FIG. 12A in more detail.
Figure 12C:
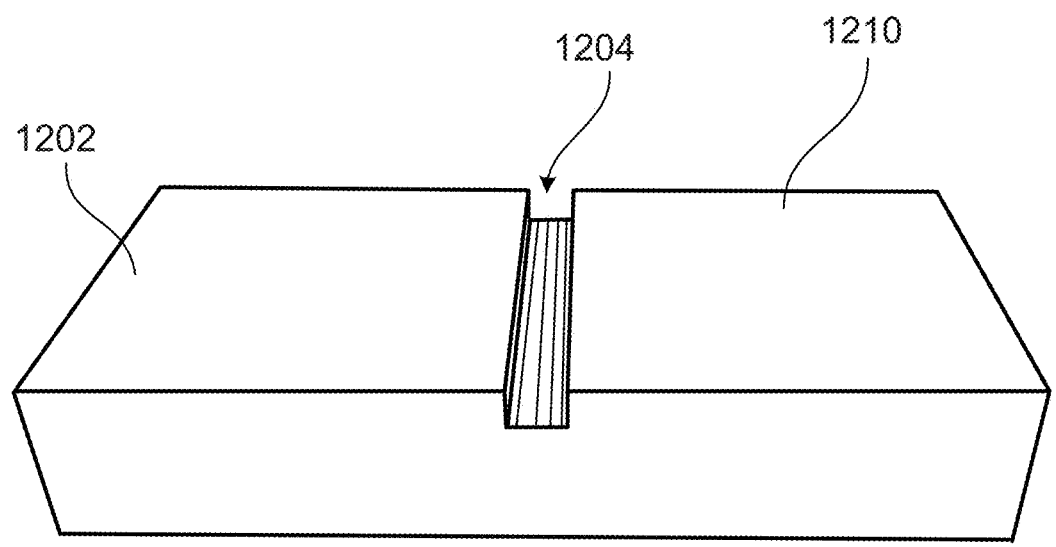

FIGS. 12A-C show an example of a hard start capacitor replacement unit 1200 and a magnet 1202 mounted to an outside surface of the hard start capacitor replacement unit 1200. In particular, FIG. 12A shows a curved magnet 1202 that is mounted to an outside surface of a side wall 1262 of a case 1212 of the hard start capacitor replacement unit 1200 by a fastener. In the illustrated example, the fastener is a cable tie 1206 (e.g., a zip tie). When the magnet 1202 is in a mounted position (e.g., as shown in FIG. 12A), a portion of the cable tie 1206 resides in an elongated recess 1204 of the magnet 1202. The recess 1204 is configured to accept the portion of the cable tie 1206 and prevent the magnet 1202 from sliding upward or downward and out from underneath the cable tie 1206. A remainder of the cable tie 1206 wraps around an outer circumference of the case 1212 and applies an inward radial force to the magnet 1202, thereby holding the magnet 1202 in place on the outside surface of the side wall 1262 of the case 1212. In some implementations, the magnet 1202 may additionally be affixed to the case 1212 with the assistance of magnetic attraction. For example, the case 1212 may be made from a material that is magnetically attractive, and additional mounting strength can be provided by the strength of magnetic attraction between the magnet 1202 and the case 1212.

Referring to FIGS. 12B and 12C, the magnet 1202 includes the elongated recess 1204 that provides a track in which a portion of the cable tie 1206 may reside. In the illustrated example, the recess 1204 includes a plurality of grooves that interface with the cable tie 1206 when the cable tie 1206 is positioned therein.

The magnet 1202 also includes an inner curved surface 1208 that is configured to interface with the side wall 1262 of the case 1212, and an opposite outer flat surface 1210 (e.g., opposite to the curved surface 1208) that has a substantially flat shape. The flat surface 1210 can allow the case 1212 to interface with a surface (e.g., a substantially flat surface) of a separate object, such as an air conditioning system. For example, in some implementations, the magnet 1202 may be positioned on the exterior of the side wall 1262 of the case 1212 (e.g., as illustrated in FIG. 12A). The flat surface 1210 of the magnet 1202 can interface with a magnetically-attractive surface, such as a metal wall of an air conditioning unit or system. The strength of magnetic attraction between the flat surface 1210 and the magnetically-attractive surface may allow the hard start capacitor replacement unit 1200 to create a sufficient magnetic bond with the air conditioning unit or system such that the hard start capacitor replacement unit 1200 cannot become inadvertently dislodged or misaligned from its intended mounting position.

While the magnet 1202 is illustrated as being mounted directly to the case 1212 in FIG. 12A, in some implementations, one or more structures may be included to assist with and/or facilitate the mounting. For example, in some implementations, one or more mount-assist structures may be interfaced between the exterior of the side wall 1262 of the case 1212 and the magnet 1202. The structure(s) may interface with the exterior of the side wall 1262 of the case 1212 via one or more recesses, grooves, cutouts, slots, patterns, etc. that are provided on the case 1212 and/or the structure. For example, one or more recesses, grooves, cutouts, slots, patterns, etc. may be incorporated into an inner surface of the structure and configured to interface with the case 1212. In some implementations, corresponding (e.g., complementing, inverse, mirror, etc.) recesses, grooves, cutouts, slots, patterns, etc. on the case 1212 are also or alternatively provided to assist with the interfacing. For example, the case 1212 may include a recess that is configured to accept the inner surface of the mount-assist structure. The structure may include a curved surface that interfaces with the case 1212 (e.g., similar to the curved surface 1208 of the magnet 1202). Such recesses, grooves, cutouts, slots, patterns, etc. may assist in maintaining the structure in place (e.g., by guiding the structure into a particular position on the exterior of the side wall 1262 of the case 1212).

Similarly, the magnet 1202 may interface with an outer surface of the mount-assist structure (e.g., a surface that is opposite to the inner surface that interfaces with the case 1212) via one or more recesses, grooves, cutouts, slots, patterns, etc. that are provided on the structure and/or the magnet 1202. For example, one or more recesses, grooves, cutouts, slots, patterns, etc. may be incorporated into the outer surface of the structure and configured to interface with the magnet 1202. In some implementations, corresponding (e.g., complementing, inverse, mirror, etc.) recesses, grooves, cutouts, slots, patterns, etc. on the magnet 1202 are also or alternatively provided to assist with the interfacing. For example, the mount-assist structure may include a recess that is configured to accept the magnet 1202. In some implementations, a magnet other than the magnet 1202 illustrated in FIGS. 12A-C may be used. For example, a rectangular magnet with flat sides may be used. In this way, the structure may include a rectangular recess with a flat surface that is sized and shaped to match the rectangular magnet, and the rectangular magnet may be configured to fit into the recess. Such recesses, grooves, cutouts, slots, patterns, etc. may assist in maintaining the magnet in place (e.g., by guiding the magnet into a particular position on the mount-assist structure, and thus into a particular position with respect to the exterior of the side wall 1262 of the case 1212). In some implementations, one or more materials (e.g., adhesive, epoxy, etc.) can be used to assist in affixing the structure(s) to the case 1212 and/or the magnet to the structure(s).

In some implementations, rather than one or more mount-assist structures being used to facilitate the mounting of the magnet 1202 (or a different magnet) to the case 1212, one or more of the recess, groove, cutout, slot, pattern, etc. techniques described above may be applied to the case 1212 and/or the magnet 1202 directly to assist with the mounting. For example, one or more recesses, grooves, cutouts, slots, patterns, etc. may be incorporated into the exterior of the side wall 1262 of the case 1212 and configured to interface with the magnet 1202. In some implementations, corresponding (e.g., complementing, inverse, mirror, etc.) recesses, grooves, cutouts, slots, patterns, etc. on the magnet 1202 are also or alternatively provided to assist with the interfacing. For example, the exterior of the side wall 1262 of the case 1212 may include a recess that is configured to accept the magnet 1202. In some implementations, the recess may be sized and shaped to accept the curved surface 1208 of the magnet 1202 such that the magnet 1202 resides at least partially within the recess. Such recesses, grooves, cutouts, slots, patterns, etc. may assist in maintaining the magnet 1202 in place (e.g., by guiding the magnet 1202 into a particular position on the exterior of the side wall 1262 of the case 1212). In some implementations, one or more materials (e.g., adhesive, epoxy, etc.) can be used to assist in affixing the magnet 1202 to the case 1212.

Similarly, in some implementations, one or more of the recess, groove, cutout, slot, pattern, etc. techniques described above may be applied to another surface of the magnet 1202 (e.g., the flat surface 1210 of the magnet 1202) to assist with interfacing the magnet 1202 with the surface of the separate object (e.g., the air conditioning system). For example, one or more recesses, grooves, cutouts, slots, patterns, etc. may be incorporated into the flat surface 1210 of the magnet 1202 and configured to interface with the surface of the air conditioning system. As described above, the strength of magnetic attraction between the magnet 1202 and a magnetically-attractive surface of the air conditioning system may improve the bond between the two. However, in some implementations, the inclusion of one or more recesses, grooves, cutouts, slots, patterns, etc. may improve the integrity of the interface between the magnet 1202 and the surface and therefore minimize the need to rely on any magnetic attraction to assist with the interface. In this way, in some implementations, the magnet 1202 (and the hard start capacitor replacement unit 1200) may be mounted to surfaces that have little or no magnetic attraction to the magnet 1202. In some implementations, corresponding (e.g., complementing, inverse, mirror, etc.) recesses, grooves, cutouts, slots, patterns, etc. on the mounting surface (e.g., of the air conditioning system) can also or alternatively be provided to assist with the interfacing. For example, the mounting surface may include a recess that is configured to accept the magnet 1202. In some implementations, the recess may be sized and shaped to accept the flat surface 1210 of the magnet 1202 such that the magnet 1202 resides at least partially within the recess. Such recesses, grooves, cutouts, slots, patterns, etc. may assist in maintaining the magnet 1202 in place (e.g., by guiding the magnet 1202 into a particular position on the mounting surface of the air conditioning system). In some implementations, one or more materials (e.g., adhesive, epoxy, etc.) can be used to assist in affixing the magnet 1202 to the mounting surface, although it should be understood that such materials are not necessary. Further, it should be understood that the recess, groove, cutout, slot, pattern, etc. techniques described above can be implemented in addition to the cable tie 1206 or, in some cases, without the cable tie 1206 to assist in the mounting.

In some implementations, the magnet 1202 may be mounted toward a middle portion of the hard start capacitor replacement unit 1200 (e.g., toward the middle in an axial direction) as shown in FIG. 12A. However, in some implementations, the magnet 1202 may be mounted elsewhere. For example, in some implementations, the magnet 1202 may be mounted toward a top portion or a bottom portion of the hard start capacitor replacement unit 1200.

Figure 13A:
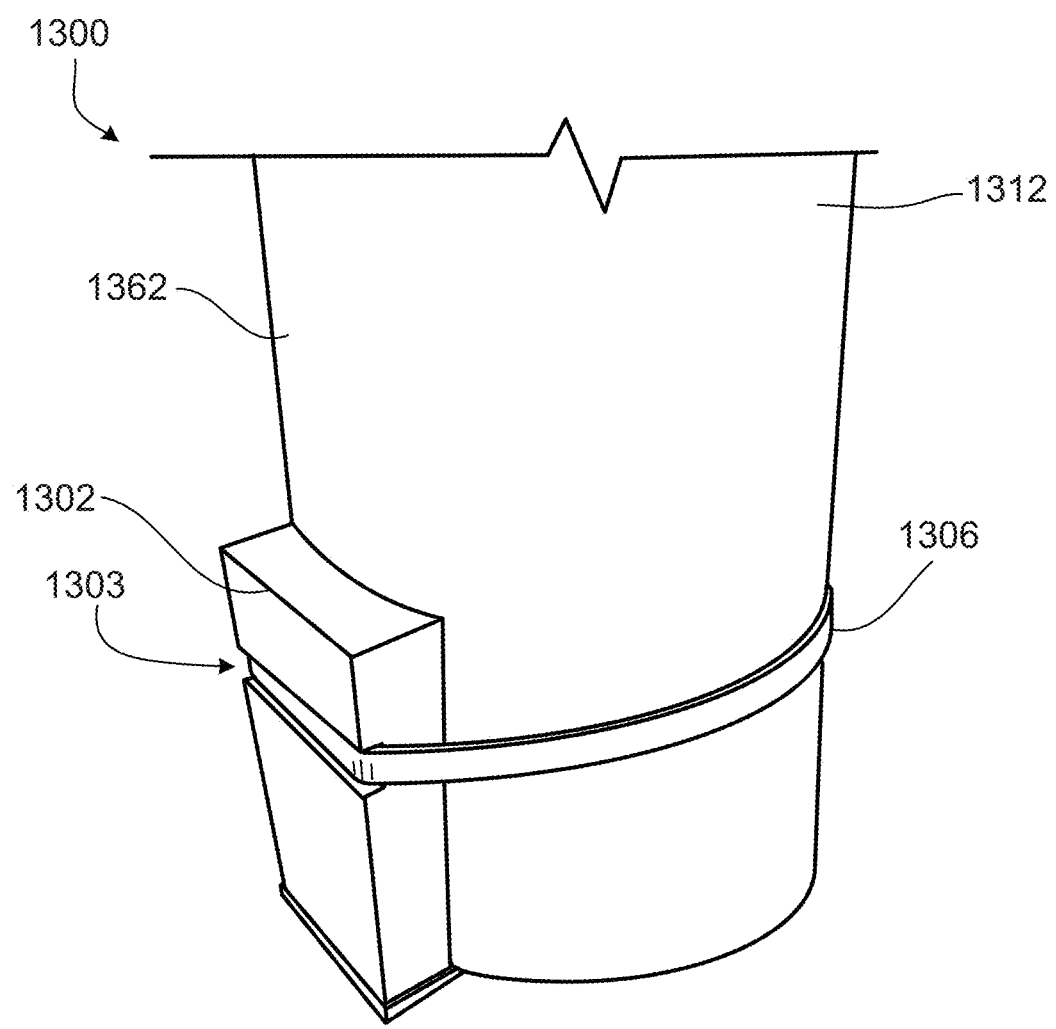
FIG. 13A shows another example of a hard start capacitor replacement unit and a magnet.
Figure 13B:
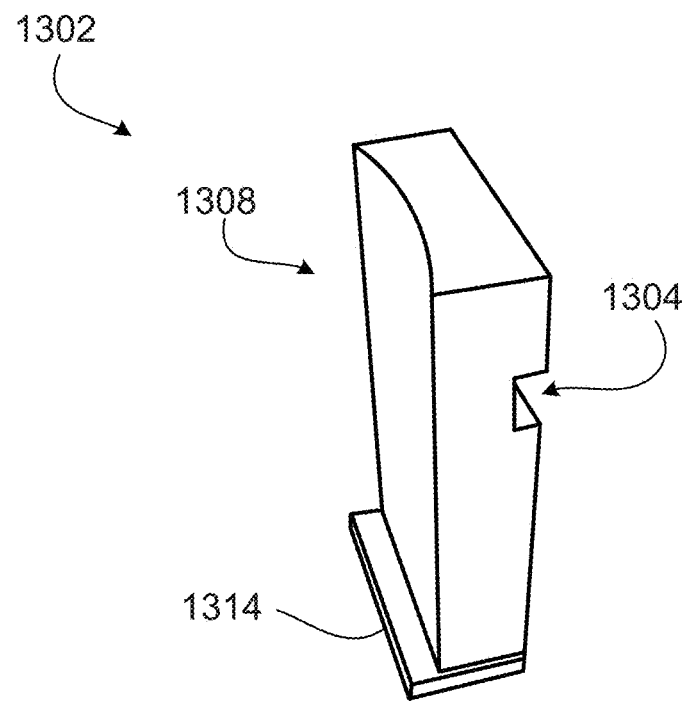
Figure 13C:
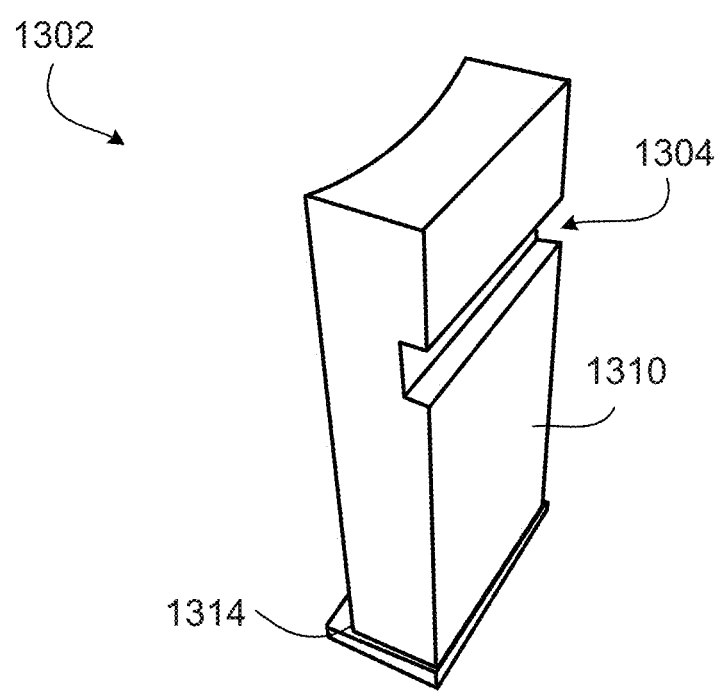

FIG. 13A shows another example of a hard start capacitor replacement unit 1300 and a magnet 1302 that is mounted toward a bottom portion of the hard start capacitor replacement unit 1300. FIGS. 13B and 13C show the magnet 1302 in more detail. As described above, in some implementations, the hard start capacitor replacement units described herein may include one or more relays (e.g., potential relays, control relays, electronic relays, etc.), such as the electronic relay 18 of FIG. 1. A relay may be accommodated above a capacitor container of the hard start capacitor replacement unit 1300 within a projected cylindrical envelope thereof. In some implementations, the hard start capacitor replacement unit 1300 may be configured to accept a cylindrical cap that can surround and cover the relay.

In some implementations, operations of the relay may be affected by magnetic fields in the vicinity of the relay. In particular, the magnets described herein may alter the magnetic field around the relay and cause the relay to operate in a manner that is undesirable. In some implementations, the positioning of the magnet 1302 toward the bottom portion of the hard start capacitor replacement unit 1300 (e.g., as shown in FIG. 13A) and away from the relay mounted toward the top portion of the hard start capacitor replacement unit 1300 may minimize the impact of the magnetic field created by the magnet 1302 on the operation of the relay, thereby allowing the relay to operate as intended.

The magnet 1302 illustrated in FIGS. 13A-C may be similar to the magnet 1202 illustrated in FIGS. 12A-C. For example, the magnet 1302 is a curved magnet 1302 that is mounted to an outside surface of a side wall 1362 of a case 1312 of the hard start capacitor replacement unit 1300 by a cable tie 1306. When the magnet 1302 is in a mounted position (e.g., as shown in FIG. 13A), a portion of the cable tie 1306 resides in an elongated recess 1304 of the magnet 1302. The recess 1304 is configured to accept the portion of the cable tie 1306 and assist in preventing the magnet 1302 from sliding upward or downward and out from underneath the cable tie 1306. A remainder of the cable tie 1306 wraps around an outer circumference of the case 1312 and applies an inward radial force to the magnet 1302, thereby holding the magnet 1302 in place on the outside surface of the side wall 1362 of the case 1312. In some implementations, the magnet 1302 may additionally be affixed to the case 1312 with the assistance of magnetic attraction. For example, the case 1312 may be made from a material that is magnetically attractive, and additional mounting strength can be provided by the strength of magnetic attraction between the magnet 1302 and the case 1312.

Referring to FIGS. 13B and 13C, the magnet 1302 includes the elongated recess 1304 that provides a track in which a portion of the cable tie 1306 may reside. In the illustrated example, the recess 1304 includes a plurality of grooves that interface with the cable tie 1306 when the cable tie 1306 is positioned therein.

The magnet 1302 also includes an inner curved surface 1308 that is configured to interface with the side wall 1362 of the case 1312, and an opposite outer flat surface 1310 (e.g., opposite to the curved surface 1308) that has a substantially flat shape. The flat surface 1310 can allow the case 1312 to interface with a surface (e.g., a substantially flat surface) of a separate object, such as an air conditioning system. For example, in some implementations, the magnet 1302 may be positioned on the exterior of the side wall 1362 of the case 1312 (e.g., as illustrated in FIG. 13A). The flat surface 1310 of the magnet 1302 can interface with a magnetically-attractive surface, such as a metal wall of an air conditioning unit or system. The strength of magnetic attraction between the flat surface 1310 and the magnetically-attractive surface may allow the hard start capacitor replacement unit 1300 to create a sufficient magnetic bond with the air conditioning unit or system such that the hard start capacitor replacement unit 1300 cannot become inadvertently dislodged or misaligned from its intended mounting position.

In the illustrated example, the magnet 1302 also includes a projection 1314 toward a bottom portion of the magnet 1302 that is configured to assist in holding the magnet 1302 in place at an intended mounted location on the case 1312 of the hard start capacitor replacement unit 1300. The projection 1314 may be formed as a lip (e.g., a tab or shelf) that extends horizontally, thereby creating a bottom surface of the magnet 1302 that has an area that is larger than a horizontal cross section of the magnet 1302. Referring to FIG. 13A in particular, the magnet 1302 may be mounted toward the bottom portion of the case 1312 such that the projection 1314 resides beneath a bottom surface of the case 1312 of the hard start capacitor replacement unit 1300. The projection 1314 can prevent the magnet 1302 from sliding upward and out from underneath the cable tie 1306.

Like the hard start capacitor replacement unit 1200 and magnet 1202 described with respect to FIGS. 12A-C, the hard start capacitor replacement unit 1300 and magnet 1302 illustrated in FIGS. 13A-C may also employ one or more structures to assist with and/or facilitate the mounting. For example, one or more mount-assist structures may be interfaced between the exterior of the side wall 1362 and/or a bottom wall of the case 1312 and the magnet 1302. Further, one or more recesses, grooves, cutouts, slots, patterns, etc. may be provided on the case 1312, the magnet 1302, and/or the mount-assist structure to assist with interfacing between the various components, in a manner similar to that described above. Similarly, one or more of the recess, groove, cutout, slot, pattern, etc. techniques described above may be applied to another surface of the magnet 1302 (e.g., the flat surface 1310 of the magnet 1302) to assist with interfacing the magnet 1302 with a surface of a separate object (e.g., the air conditioning system). In some implementations, one or more materials (e.g., adhesive, epoxy, etc.) may be used to assist in affixing the magnet 1302 to the case 1312 and/or the magnet 1302 to a mounting surface. For example, an epoxy may be placed between the magnet 1302 and an exterior of a bottom surface of the case 1312 and/or the exterior of the side wall 1362 of the case 1312.

In some implementations, the magnet 1202, 1302 may be mounted to the hard start capacitor replacement unit 1200, 1300 such that the magnet 1202, 1302 is configured to maintain a particular vertical (e.g., axial) position on the case 1212, 1312 while being permitted to rotate about the case 1212, 1312. For example, mounting by the cable tie 1206, 1306 may sufficiently hold the magnet 1202, 1302 in place against the case 1212, 1312 of the hard start capacitor replacement unit 1200, 1300 such that the magnet 1202, 1302 will not become dislodged from the case 1212, 1312, yet the cable tie 1206, 1306 may include enough slack to allow the magnet 1202, 1302 to be rotated about a central axis of the case 1212, 1312 when a tangential force is applied to the magnet 1202, 1302. In some implementations, an adhesive and/or epoxy may be omitted between the case 1212, 1312 and the magnet 1202, 1302 to allow for such rotation. Rotating the magnet 1202, 1302 about the case 1212, 1312 can allow a user to customize the configuration of the magnet 1202, 1302 to meet a particular need. For example, the magnet 1202, 1302 can be positioned as desired to allow the hard start capacitor replacement unit 1200, 1300 to be mounted at a desired position. In some examples, the magnet 1202, 1302 can be positioned such that particular ones of the terminals of the hard start capacitor replacement unit 1200, 1300 are positioned at desired locations. The magnet 1202, 1302 can be rotated such that one or more particular terminals of the hard start capacitor replacement unit 1200, 1300 are accessible or more easily accessible (e.g., for attaching a wire thereto). For example, the magnet 1202, 1302 may be rotated such that a terminal to which a wire/clip is to be attached is openly positioned (e.g., with sufficient clearance) when the hard start capacitor replacement unit 1200, 1300 is mounted at a desired position at an air conditioning unit.

In some implementations, the hard start capacitor replacement unit 1200, 1300 and magnet 1202, 1302 can be provided (e.g., from a manufacturer or supplier) in an assembled form substantially as illustrated in FIGS. 12A and 13A. For example, the hard start capacitor replacement unit 1200, 1300 can be provided with the magnet 1202, 1302 mounted thereon by the cable tie 1206, 1306. In this way, the hard start capacitor replacement unit 1200, 1300, the magnet 1202, 1302, and the cable tie 1206, 1306 are all in contact with their respective components (e.g., at the time of manufacturer and/or prior to shipping).

In some implementations, the various components illustrated in FIGS. 12A-C and 13A-C may be provided separately for subsequent assembly. In this way, one or more of the hard start capacitor replacement unit 1200, 1300, the magnet 1202, 1302, and the cable tie 1206, 1306 may not be in contact with each other initially (e.g., at the time of shipping). For example, the illustrated components may be provided as a capacitor mounting kit/system that includes the hard start capacitor replacement unit 1200, 1300, the magnet 1202, 1302, and the cable tie 1206, 1306 (and in some cases the mount-assist structure(s)) for assembly by an end user and/or a retailer. In some implementations, the hard start capacitor replacement unit 1200, 1300 can be provided without the magnet 1202, 1302, the cable tie 1206, 1306, and/or the mount-assist structure(s) in a form that is configured to be fitted with a separate magnet and a cable tie after the fact. For example, the hard start capacitor replacement unit 1200, 1300 may be provided with an indicator, label, recess, etc. indicating a location at which a magnet should be provided and including instructions for using a cable tie to assist with such mounting. In some implementations, the hard start capacitor replacement unit 1200, 1300 and the magnet 1202, 1302 may be provided together with instructions for the end user to mount the magnet 1202, 1302 to the hard start capacitor replacement unit 1200, 1300 by a cable tie (which is to be obtained by the end user).

In some implementations, the magnet 1202, 1302 can have one or more characteristics of the various magnets described herein, including but not limited to the magnets 1002 and 1102 of FIGS. 10 and 11, in any of a number of combinations.

In some implementations, any of the various magnets described herein (e.g., the magnet 1002 of FIG. 10, and/or the magnet 1102 of FIG. 11, and/or the magnet 1202, 1302 of FIGS. 12A-C and 13A-C, and/or multiple ones of the magnets as described herein in any combination of configurations) may be mounted inside and/or outside of the case 1012, 1112, 1212, 1312 of the hard start capacitor replacement unit 1000, 1100, 1200, 1300. For example, to name a few examples, and not by way of limitation, multiple disk shaped magnets may be mounted on an exterior of the case 1012, 1112, 1212, 1312. In particular, multiple disk shaped magnets in a stacked configuration, as described above, may be positioned on an exterior (e.g., bottom) surface of the bottom wall 1064, 1164, 1264, 1364 of the hard start capacitor replacement unit 1000, 1100, 1200, 1300. In some implementations, a first disk shaped magnet may be mounted inside of the case 1012, 1112, 1212, 1312 and a second disk shaped magnet may be mounted outside of the case 1012, 1112, 1212, 1312 (e.g., on the exterior surface of the bottom wall 1064, 1164, 1264, 1364 of the hard start capacitor replacement unit 1000, 1100, 1200, 1300). In some implementations, any combination of one or more disk shaped magnets, and/or one or more strip shaped magnets, and/or one or more curved magnets, etc. may be mounted in any combination of inside and/or outside of the case 1012, 1112, 1212, 1312 of the hard start capacitor replacement unit 1000, 1100, 1200, 1300. In sum, while particular implementations are described herein and illustrated in the figures, it should be understood that any combination of the interior and/or exterior magnets described herein may be incorporated into the various hard start capacitor replacement units 10, 1000, 1100, 1200, and/or 1300 described herein.

In some implementations, providing magnetic mounting capability for the hard start capacitor replacement unit can provide a number of advantages. For example, in some implementations, a component to which or within which the hard start capacitor replacement unit is to be mounted (e.g., an air conditioning system) may or may not include an area (e.g., a designated area) that is typically used for mounting the hard start capacitor replacement unit. However, the user may desire to mount the hard start capacitor replacement unit elsewhere. By providing magnetic mounting capability, the number of options for mounting can be greatly increased.

In some implementations, the hard start capacitor replacement unit is mounted at locations that include metallic and/or magnetic objects. Such objects may impact the performance of the hard start capacitor replacement unit. In some implementations, the user may desire to mount the hard start capacitor replacement unit at a particular location such that particular operating conditions are achieved. Magnetic mountability of the hard start capacitor replacement unit can allow the user to mount the hard start capacitor replacement unit at such locations. In some examples, the hard start capacitor replacement unit can be mounted at locations that allow for shorter conductive connections (e.g., wires) between the capacitance value terminals and common cover terminal and the device to which the hard start capacitor replacement unit is connected. Without such flexibility in possible mounting locations, the wires may be excessively long and may be susceptible to being cut or broken along with being susceptible to noise and/or distortions.

Accordingly, a hard start capacitor replacement unit has been described which fulfills the objects of the invention herein. It will be appreciated that various changes may be made by those skilled in the art without departing from the spirit and scope of the invention, which is limited only by the following claims.

What is claimed is:

1. An apparatus comprising:
   a container capable of receiving a plurality of capacitive devices, each of the plurality of capacitive devices having a first capacitor terminal and a second capacitor terminal;
   a cover configured to be mounted to the container, wherein the cover comprises:
      a common cover terminal having at least one contact extending from the cover;
      a plurality of capacitor cover terminals, each of the plurality of capacitor cover terminals having at least one contact extending from the cover;
      a plurality of first conductors, wherein each of the plurality of first conductors is configured to electrically connect to one of the first capacitor terminals of the plurality of capacitive devices and one of the plurality of capacitor cover terminals;
      a second conductor configured to electrically connect to each of the second capacitor terminals of the plurality of capacitive devices and the common cover terminal; and
      a plurality of insulation structures, wherein each insulation structure is associated with one of the plurality of capacitor cover terminals;
   a magnet positioned external to the container, the magnet including an inner surface and an outside surface opposite the inner surface, wherein the outside surface includes a recess, and wherein the inner surface is curved and configured to interface with an outer surface of the container, wherein the magnet comprises a projection to position the magnet relative to the container; and
   a relay positioned external to the container and configured to control opening and closing of contacts, wherein selected ones of the plurality of capacitive devices are electrically connected to equipment external to the container when the contacts are closed.

2. The apparatus of claim 1, wherein each of the plurality of capacitive devices is a metalized film capacitor.

3. The apparatus of claim 1, wherein the plurality of capacitive devices comprises four capacitive devices.

4. The apparatus of claim 3, wherein the four capacitive devices provide capacitance values of about 48 microfarads, about 48 microfarads, about 88 microfarads, and about 112 microfarads, respectively.

5. The apparatus of claim 1, wherein the common cover terminal is approximately centered on the cover.

6. The apparatus of claim 1, further comprising an insulation barrier separating the plurality of capacitor cover terminals and the common cover terminal.

7. The apparatus of claim 1, wherein the relay is an electronic relay.

8. The apparatus of claim 1, wherein the relay is a control relay or a potential relay.

9. The apparatus of claim 1, wherein the apparatus is a hard start capacitor adaptable to a plurality of motors, wherein the hard start capacitor provides a different capacitance values to each motor of the plurality of motors.

10. The apparatus of claim 1, wherein the apparatus is suitable for use in applications requiring capacitance values ranging from 240 microfarads to 324 microfarads.

11. The apparatus of claim 1, wherein the magnet has a strength of approximately 30-150 milliTeslas.

12. The apparatus of claim 1, wherein the magnet is a ferrite ceramic magnet.

13. The apparatus of claim 1, wherein the magnet is a permanent magnet.

14. The apparatus of claim 1, wherein the magnet includes one or more of ferric oxide, iron oxide, barium, barium carbonate, strontium, or strontium carbonate.

15. The apparatus of claim 1, wherein the magnet includes one or more magnetically soft materials.

16. The apparatus of claim 1, wherein the magnet includes one or more magnetically hard materials.

17. The apparatus of claim 1, wherein the magnet is a rare-earth magnet.

18. The apparatus of claim 1, wherein the recess is generally rectangular.

19. The apparatus of claim 1, wherein the outside surface is a flat surface.

* * * * *